(12) United States Patent
Brockmeyer et al.

(10) Patent No.: US 6,975,769 B2
(45) Date of Patent: Dec. 13, 2005

(54) OPTIMIZED DATA TRANSFER AND STORAGE ARCHITECTURE FOR MPEG-4 MOTION ESTIMATION ON MULTI-MEDIA PROCESSORS

(75) Inventors: Erik Brockmeyer, Heverlee (BE); Francky Catthoor, Temse (BE)

(73) Assignee: Interuniversitair Micro-Elektronica Centrum (IMEC VZW), Leuven (BE)

( * ) Notice: Subject to any disclaimer, the term of this patent is extended or adjusted under 35 U.S.C. 154(b) by 48 days.

(21) Appl. No.: 10/766,159

(22) Filed: Jan. 27, 2004

(65) Prior Publication Data

US 2004/0184541 A1 Sep. 23, 2004

Related U.S. Application Data

(62) Division of application No. 09/261,804, filed on Mar. 3, 1999, now Pat. No. 6,690,835.
(60) Provisional application No. 60/076,795, filed on Mar. 4, 1998, and provisional application No. 60/076,685, filed on Mar. 3, 1998.

(51) Int. Cl.[7] ............................................. G06K 9/36
(52) U.S. Cl. ..................................................... 382/236
(58) Field of Search ............................ 382/232, 236, 382/238, 248, 250; 375/240.12, 240.15, 240.16, 240.18, 240.2; 348/394.1, 395.1, 400.1–403.1, 407.1, 409.1, 413.1, 416.1, 430.1, 431.1

(56) References Cited

U.S. PATENT DOCUMENTS

| | | | |
|---|---|---|---|
| 5,208,673 A | 5/1993 | Boyce | |
| 5,630,033 A | 5/1997 | Purcell et al. | |
| 5,978,509 A | 11/1999 | Nachtergaele et al. | |
| 6,028,631 A | 2/2000 | Nakaya et al. | |
| 6,414,997 B1 * | 7/2002 | Piccinelli et al. | 375/240.17 |
| 6,456,659 B1 * | 9/2002 | Zuccaro et al. | 375/240.16 |
| 6,690,835 B1 * | 2/2004 | Brockmeyer et al. | 382/236 |

FOREIGN PATENT DOCUMENTS

| | | |
|---|---|---|
| EP | 0698861 A1 | 2/1995 |
| EP | 0 698 861 A1 | 2/1996 |
| EP | 0848558 A1 | 7/1997 |
| EP | 0 848 558 A1 | 6/1998 |

OTHER PUBLICATIONS

Diguet, et al., Formalized methodology for data reuse exploration in hierarchical memory mappings, *Proceeding 1997 International Symposium on Low Power Electronics and Design*, Monterey, CA USA, Aug. 18–20 1997 pp 30–35.

Greef, et al., Mapping real–time motion estimation type algorithms to memory efficient, programmable multi–processor architectures, *Microprocessing and Microprogramming* 41:409–423 (1995).

(Continued)

*Primary Examiner*—Jose L. Couso
(74) *Attorney, Agent, or Firm*—Knobbe, Martens, Olson & Bear, LLP

(57) ABSTRACT

The invention presents video information stream encoding methods used in applications of a data storage and transfer design methodology for data-dominated applications. The invention relates to video encoding methods with variable video frames designed such that the digital system on which the methods are implemented, consumes a minimal of power, during their execution and still obtain excellent performance such as speed compliance. The resulting video information stream encoding methods can be mapped on different processor architectures and custom hardware. The methods enable combined low power consumption, reduced bus loading and increased performance to achieve speed compliance. The encoding methods are essentially based on block-based motion estimation and grouping of motion estimations of various video frames.

9 Claims, 24 Drawing Sheets

OTHER PUBLICATIONS

Copy of European Search Report; Application No. EP 99 10 4301.

Greef, et al., Mapping real–time motion estimation type algorithms to memory efficient, programmable multi–processor architectures, Microprocessing and Microprogramming 41 (1995) 409–423.

IEEE workshop on VLSI signal processing. La Jolla, CA, Oct. 1994. "Global communication and memory optimizing transformations for low power signal processing systems", Catthoor, et al., 12 pages.

IEEE Journal of Solid–State Circuits, vol. 31, No. 9, Sep. 1996. "Energy Dissipation in General Purpose Microprocessors" Gonzalez, et al., pp. 1277–1283.

Proceedings of the IEEE, vol. 83, No. 2, Feb. 1995. "VLSI Architectures for Video Compression—A Survey". Pirsch, et al., pp. 220–246.

IEEE Transactions on Circuits and Systems for Video Technology, vol. 6, No. 1, Feb. 1996. "Architecture and Applications of the HiPAR Video Signal Processor", Ronner, et al., pp. 56–66.

IEEE Workshop on VLSI signal processing, Monteray, CA, Oct. 1996. "Low Power Storage Exploration for H.263 Video Decoder", Nachtergaele, et al., 12 pages.

In a paper collection on Low Power CMOS design, IEEE Press, pp. 609–618. "System–level transformation for low power data transfer and storage", Catthoor, et al., pp. 1–8.

Proc. IEEE Intnl. Symp. on Low Power Design, Monteray, Aug. 1996 "Power Exploration for Data Dominated Video Applications", Wuytack, et al., pp. 359–364.

IEEE Transactions on Circuits and Systems for Video Technology, vol. 7, No. 1, Feb. 1997. "The M–PEG Video Standard Verification Model", Thomas Sikora, pp. 19–31.

Agarwal, R. et al., Coding of moving pictures and audio, N1693 "International organization for standardization, ISO/IEC/JTC1/SC29WG11," Apr. 1997.

Amarasinghe, S. et al., "The SUIF compiler for scalable parallel machines," in *Proc. of the 7th SIAM Conf. on Parallel Proc. for Scientific Computing*, 1995.

Bacon, D.F. et al., "Compiler transformations for high–performance computing," Computer Science Division, University of California, Berkeley, California, 1994.

Brodersen, R.W., "The Network Computer and its Future," *Proc. IEEE Int. Solid–State Circ. Conf.*, San Francisco CA, pp. 32–36, Feb. 1997.

Catthoor, F. "Energy–delay efficient data storage and transfer architectures: circuit technology versus design methodology solutions," *Proceedings of DATE'98*, Feb. 23–25 1998.

Chandrakasan, A. et al., "Data driven signal processing: an approach for energy efficient computing," *Proc. IEEE Intnl. Symp. on Low Power Design*, Monterey CA, pp. 347–352, Aug. 1996.

Chatterjee, P. (President Personal Productivity Products, Texas Instruments), "Gigachips: deliver affordable digital multi–media for work and play via broadband network and set–top box," Plenary paper in *Proc. IEEE Int. Solid–State Circ. Conf.*, San Francisco CA, pp. 26–30, Feb. 1995.

Danckaert, K. et al., "System level memory optimization for hardware–software co–design," *Proc. IEEE Intnl. Workshop on Hardware/Software Co–design*, Braunschweig, Germany, pp. 55–59, Mar. 1997.

De Greef, E. et al., "Memory organization for video algorithms on programmable signal processors," *Proc. IEEE Int. Conf. on Computer Design*, Austin TX, pp. 552–557, Oct. 1995.

Evans, R.J. et al., "Energy consumption modeling and optimization for SRAMs," *IEEE journal of solid state circuits*, vol 30, No 5, May 1995.

Gannon, D., "Strategies for cache and local memory management by global program transformation," Journal of parallel and distributed computing 5, Academic press, pp. 587–616, 1988.

Itoh, K. et al., "Trends in low–power RAM circuit technologies," special issue on "Low power design" of the *Proceedings of the IEEE*, vol. 83, No. 4, pp. 524–543, Apr. 1995.

Kolson, D. et al., "Minimization of memory traffic in high–level synthesis," *Proc. 31st ACM/IEEE Design Automation Conf.*, San Diego CA, pp. 149–154, Jun. 1994.

Lippens, P. et al., Allocation of multiport memories for hierarchical data streams, *Proc. IEEE Int. Conf. Comp. Aided Design*, Santa Clara CA, Nov. 1993.

Meng, T.H. et al., "Portable video–on–demand in wireless communication," special issue on "Low power electronics" of the *Proceedings of the IEEE*, vol. 83, No. 4, pp. 659–680, Apr. 1995.

Moolenaar, D. et al., "System–level power exploration for MPEG–2 decoder on embedded cores : a systematic approach," *Proc. IEEE Wsh. on Signal Processing Systems (SIPS)*, Leicester, UK, Nov. 1997.

Nachtergaele, L. et al., "Low power data transfer and storage exploration for H.263 video decoder system," accepted for special issue on *Very low–bit rate video coding* (eds. Argy Krikelis et al.) of *IEEE Journal on Selected Areas in Communications*, vol. 16, No. 2, Feb. 1998.

Nachtergaele, L. et al., "Optimisation of memory organisation and hierarchy for decreased size and power in video and image processing systems," *Proc. Intnl. Workshop on Memory Technology, Design and Testing*, San Jose CA, pp. 82–87, Aug. 1995.

Nachtergaele, L. et al., "System–level power optimization of video codecs on embedded cores : a systematic approach," accepted for special issue on *Future directions in the design and implementation of DSP systems* (eds. Wayne Burleson et al.) of *Journal of VLSI Signal Processing*, No., Kluwer, Boston, pp., Feb. 1998.

Rabaey, J., "System–level power estimation and optimization—challenges and perspectives," *Proc. IEEE Intnl. Symp. on Low Power Design*, Monterey CA, pp. 158–160, Aug. 1997.

Seki, T. et al., "A 6–ns 1–Mb CMOS SRAM with Latched Sense Amplifier," IEEE J. of Solid–state Circuits, vol. SC–28, No. 4, pp. 478–488, Apr. 1993.

Slavenburt, G. et al., "TriMedia, TM1000 Preliminary Data Book," Philips electronics North America Corporation, Tri-Media product group, 811 E. Arques Avenue, Sunnyvale CA, 1997.

Slock, P. et al., "Fast and extensive system–level memory exploration for ATM applications," *Proc. 10th ACM/IEEE Intnl. Symp. on System–Level Synthesis*, Antwerp, Belgium, pp. 74–81, Sep. 1997.

Tiwari, V. et al., "Power analysis of embedded software: a first step towards software power minimization," *Proc.*

*IEEE Int. Conf. Comp. Aided Design*, Santa Clara CA, pp. 384–390, Nov. 1994, Also in *IEEE Trans. on VLSI Systems*, vol. 2, No. 4, pp. 437–445, Dec. 1994.

van Swaaij, M. et al., "Modelling data and control flow for high–level memory management," *Proc. 3rd ACM/IEEE Europ, Design Automation Conf.*, Brussels, Belgium, pp. 8–13, Mar. 1992.

Verbauwhede, I. et al., "Background memory management for the synthesis of algebraic algorithms on multi–processor DSP chips," *Proc. VLSI'89, Int. Conf. on VLSI*, Munich, Germany, pp. 209–218, Aug. 1989.

Wolf, M. et al., "A loop transformation theory and an algorithm to maximize parallelism," *IEEE Trans. on Parallel and Distributed Systems*, vol. 2, No. 4, pp. 452–471, Oct. 1991.

* cited by examiner

```
for (all MBs)  %process all MB form P-VOP%
    fullpel_motion_estimation(current MB from P-VOP on previous  VOP)
for (all MBs) %process all MB form P-VOP%
    halfpel_motion_estimation(current MB from P-VOP on previous  VOP)
for (all MBs) %process all MB form P-VOP%
    motion_compensation(current MB from P-VOP on previous  VOP)
error_VOP = original_VOP - compensated_VOP
for (all MBs) %process all MB from P-VOP%
    code(current error MB from P-VOP)
for (all B-VOPs)
    for (all MBs) % process all MB form B-VOP%
        fullpel_motion_estimation(current MB from current B-VOP on previous  VOP)
    for (all MBs) %process all MB from B-VOP%
        halfpel_motion_estimation(current MB from current B-VOP on previous  VOP)
    for (all MBs) %process all MB from B-VOP%
        fullpel_motion_estimation(current MB from current B-VOP on next  VOP)
    for (all MBs) % process all MB from B-VOP%
        halfpel_motion_estimation(current MB from current B-VOP on next  VOP)
        motion_compensation(current MB)
    error_VOP = original_VOP - compensated_VOP
    for (all MBs) %process all MB form B-VOP%
        code(current MB form Current B-VOP)
```

Original (VOP-oriented) MPEG-4 like source code

FIG. 2

```
for (all Mbs) % process all MB from P-VOP %
    fullpel_motion_estimation(current MB from P-VOP on previous VOP)
    halfpel_motion_estimation(current MB from P-VOP on previous VOP)
    motion_compensation(current MB from P-VOP)
    error_MP = original_MB-compensated_MB
    code(current error MB from P-VOP)
for (all B-VOPs)
    for (all Mbs) %process all MB from P-VOP%
        fullpel_motion_estimation(current MB from current B-VOP on previous VOP)
        halfpel_motion_estimation(current MB from current B_VOP on previous VOP)
        fullpel_motion_estimation(current MB form current B-VOP on next VOP)
        halfpel_motion_estimation(current MB from current B-VOP on next VOP)
        motion_compensation(current MB)
        error_MB = original_MB - compensated_MB
        code(current MB from current B-VOP)
```

Invented (MB-oriented) MPEG-4 like source code

FIG. 3

```
for (all MBs)
    full_motion_estimation(on previous VOP)
    halfpel_motion_estimation(on previous VOP)
    motion_compensation(on previous VOP)
for (all MBs)
    fullpel_motion_estimation(on next VOP)
    halfpel_motion_estimation(on next VOP)
    motion_compensation(on next VOP)
    interpolation_mode(best match previous and next VOP)
```

Original (MB-oriented) MPEG-4 like source code for B-VOP encoding in interpolated mode.

FIG. 4

```
for (all MBs)
    fullpel_motion_estimation(on previous VOP)
for (all MBs)
    fullpel_motion_estimation(on nest VOP)
    halfpel_motion_estimation(on next VOP)
    halfpel_motion_estimation(on previous VOP)
    motion_compensation(on previous VOP)
    motion_compensation(on next VOP)
    interpolation_mode(best match previous and next VOP)
```

Invented (MB-oriented) MPEG-4 like source code for B-VOP encoding in interpolated mode.

FIG. 5

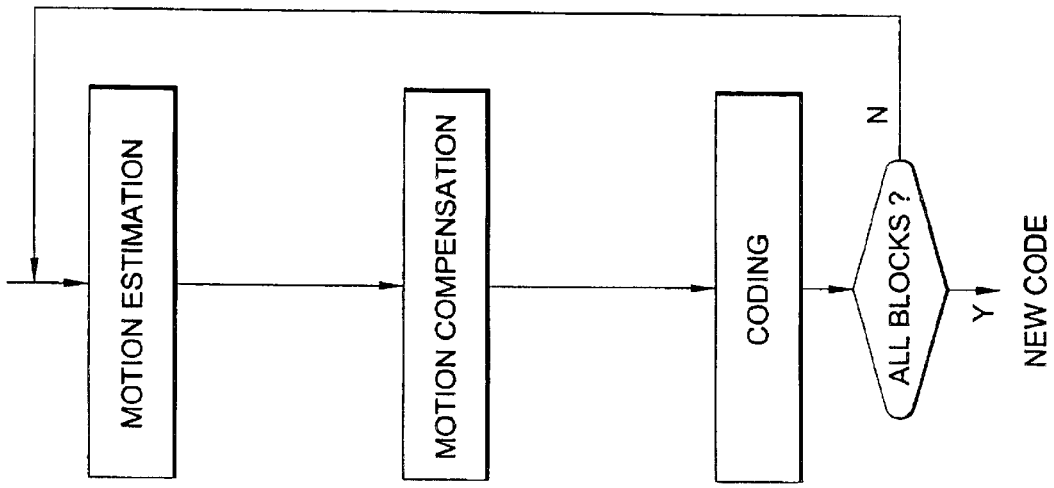
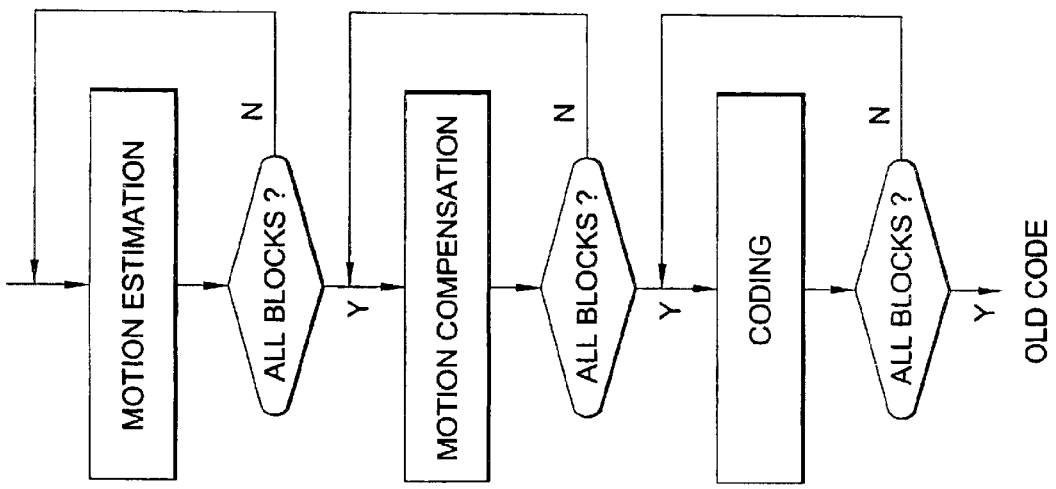
FIG. 8

OPTIMIZED DATA TRANSFER AND STORAGE ARCHITECTURE FOR MPEG-4 MOTION ESTIMATION ON MULTI-MEDIA PROCESSORS

RELATED APPLICATIONS

This application is a divisional of and incorporates by reference in its entirety U.S. application Ser. No. 09/261,804, filed Mar. 3, 1999 now U.S. Pat. No. 6,690,835, which in turn claims priority to the following applications: U.S. Provisional Patent Application No. 60/076,685, filed on Mar. 3, 1998 and U.S. Provisional Patent Application No. 60/076,795, filed on Mar. 4, 1998.

BACKGROUND OF THE INVENTION

1. Field of the Invention

The invention relates to video encoding methods with variable video frames.

2. Description of the Related Technology

A video information stream comprises a time sequence of video frames. The time sequence of video frames can be recorded for instance by a video camera/recorder. Each of the video frames can be considered as a still image. The video frames are represented in a digital system as an array of pixels. The pixels comprises luminance or light intensity and chrominance or color information. The information is stored in a memory of the digital system. For each pixel some bits are reserved. From a programming point of view each video frame can be considered as a two-dimensional data type, although the video frames are not necessary rectangular. Note that fields from an interlaced video time sequence can also be considered as video frames.

A particular aspect of the considered video frames is that they are variable in size and even location with respect to a fixed reference such as, e.g., the display. Moreover, the considered video frames support the object concept by indicating whether a pixel belongs to an object or not.

In principle when the video information stream must be transmitted between two digital systems, this can be realized by sending the video frames sequentially in time, for instance by sending the pixels of the video frames and thus the bits representing the pixels sequentially in time.

There exist, however, more elaborated transmission schemes enabling faster and more reliable communication between two digital systems the transmission schemes are based on encoding the video information stream in the transmitting digital system and decoding the encoded video information stream in the receiving digital system. Note that the same principles can be exploited for storage purposes.

During encoding the original video information stream is transformed into another digital representation the digital representation is then transmitted. While decoding the original video information stream is reconstructed from the digital representation.

The MPEG-4 standard defines such a transmission (and storage) efficient encoded digital representation of a video information stream.

Encoding requires operations on the video information stream. The operations are performed on a digital system (for instance in the transmitting digital system). Each operation performed by a digital system consumes power. The way in which the operations for encoding are performed is called a method. The methods have some characteristics such as encoding speed and the overall power consumption needed for encoding.

The digital system can either be application-specific hardware or a programmable processor architecture. It is well-known that most power consumption in the digital systems, while performing real-time multi-dimensional signal processing such as video stream encoding on the digital systems, is due to the memory units in the digital systems and the communication path between the memory units. More precisely individual read and write operations from and to memory units by processors and/or datapaths and between memories become more power expensive when the memory units are larger, and so does the access time or latency from the busses. Naturally also the amount of read and write operations are determining the overall power consumption and the bus loading. The larger the communication path the larger is also the power consumption for a data transfer operation. With communication is meant here the communication between memory units and the processors and data paths found in the digital system and between memories themselves. There is also a difference between on- and off-chip memories. Note that the same considerations are valid when considering speed as a performance criterion.

As the power consumption of the digital system is dominated by read and write operations, thus manipulations on data types, such as video frames, the methods are considered to be data-dominated.

As the algorithm specification, the algorithm choice and its implementation determine the amount of operations and the required memory sizes it is clear that these have a big impact on the overall power consumption and other performance criteria such as speed and bus loading.

A method for encoding a video information stream, resulting in a minimal power consumption of the digital system on which the method is implemented, and exhibiting excellent performance, e.g., being fast, must be based on optimized data storage, related to memory sizes, and data transfer, related to the amount of read and write operations. Such a method can be developed by transforming an initial less power optimal method by using various code manipulations. Such a transformation approach must be supported by an adequate exploration methodology.

In general a method can be described as an ordered set of operations which are repetitively executed. The repetition is organized in a loop. During execution data is consumed and produced. The code manipulations can be loop- and/or data-flow transformations. The transformations change the ordering of the operations in the loop and result in another data consumption-production ordering. Also data reuse concepts can be used in order to obtain a more power consumption and speed optimal method. Data reuse deals with specifying from and to which memory data is read and written. More in particular applying the data reuse concept means making copies of data to smaller memories and to let the data be accessed by the processors and/or datapaths from the smaller memories.

Naturally when such a power consumption and speed optimal encoding method exist it can be implemented on a digital system, adapted for the method. This adaptation can be done by an efficient programming of programmable (application specific) processor architectures or by actually designing an application-specific or domain-specific processor with the appropriate memory units.

The fact that the power consumption is heavily dominated by data storage and data transfer of multi-dimensional data types is demonstrated in the publication [F. Catthoor, F. Franssen, S. Wuytack, L. Nachtergaele, H. De Man, "Global communication and memory optimizing transformations for low power signal processing systems", IEEE workshop on VLSI signal processing, La Jolla Calif., October 1994] and [R. Gonzales, M. Horowitz, "Energy dissipation in general-purpose microprocessors", IEEE J. Solid-state Circ., Vol. SC-31, No. 9, pp. 1277–1283, September 1996] for custom hardware and programmable processors respectively.

Power consumption in deep submicron CMOS digital devices is dominated by the charging of wires on-chip and off-chip. The technological evolution aims at minimizing the power consumption by lowering the supply voltages, using short thin wires and small devices, using reduced logic swing. These non-application specific approaches do not exploit the characteristics of the application in the design of the digital system and/or implementation on a given digital system.

Some following general principles for power consumption reduction are known: match architecture and computation, preserve locality and regularity inherent in the application, exploit signal statistics and data correlations and deliver energy and performance on demand. These guidelines must however be translated and extended for a more memory related context as found in multi-media applications.

The data storage and transfer exploration methodology, applied for constructing the encoding methods presented in the invention, is discussed in the detailed description of the invention.

The different aspects of the invention will be illustrated for encoding following the MPEG-4 standard, discussed in the detailed description of the invention. The current realizations of MPEG based video coding multi-media applications can be distinguished in two main classes: the customized architectures and the programmable architectures. The disadvantages of the customized approach [P. Pirsch, N. Demassieux, W. Gehrke, "VLSI architectures for video compression—a survey", Proc. of the IEEE, invited paper, Vol. 83, No. 2, pp. 220–246, February 1995] is that the design is difficult as only limited design exploration support is available, application-specific, still has large power consumption, due to rigid memory hierarchy and central bus architecture. Many programmable processor solutions, for video and image processing, have been proposed, also in the context of MPEG [K. Roenner, J. Kneip, "Architecture and applications of the HiPar video signal processor", IEEE Trans. on Circuit and Systems for Video Technology, special issue on "VLSI for video signal processors".]. Power consumption management and reduction for such processors is however hardly tackled. The disadvantages of the implementation on a programmable processor are indeed (1) the large power consumption, due to expensive data transfers of which many are not really necessary, (2) most area of chip/board is taken up by memories and busses, (3) addressing and control complexity are high and (4) the speed is too low such that parallel processing is necessary, which are difficult to program efficiently due to data communication.

Much work has been published in the past on cache coherence protocols, for parallel processors. These approaches are mostly based on load balancing and parallelisation issues for arithmetic operations. Although some work on data localization issues in order to obtain better cache usage exist, it is clear that a more data transfer and storage oriented solution is required for data-dominated applications such as multi-media applications. Data reuse is the basis for traditional caching policies. These policies are however not sufficiently application oriented, and thus not exploiting enough the particular algorithm which must be implemented, and not based on global optimization considerations.

The use of global and aggressive system-level data-flow and loop transformations is illustrated for a customized video compression architecture for the H.263 video conferencing decoder standard in [L. Nachtergaele, F. Catthoor, B. Kapoor, D. Moolenaar, S. Janssens, "Low power storage exploration for H.263 video decoder", IEEE workshop on VLSI signal processing, Monterey Calif., October 1996] and other realistic multi-media kernels in [F. Catthoor, S. Wuytack, E. De Greef, F. Franssen, L. Nachtergaele. H. De Man,"System-level transformations for low power data transfer and storage", in paper collection on "Low power CMOS design" (eds. A. Chandrakasan, R. Brodersen), IEEE Press, pp. 609–618, 1998] [S. Wuytack, F. Catthoor, L. Nachtergaele, H.De Man, "Power Exploration for Data Dominated Video Applications", Proc. IEEE Intnl. Symp. on Low Power Design, Monterey, pp. 359–364, August 1996].

SUMMARY OF THE INVENTION

The invention includes video information stream encoding methods, for application with a data storage and transfer design methodology for data-dominated applications.

The invention relates to video encoding methods with variable video frames designed such that the digital system on which the methods are implemented, consumes a minimal of power, during execution of the methods and still excellent performance such as speed compliance is obtained.

The resulting video information stream encoding methods can be mapped on different processor architectures and custom hardware. The methods enable combined low power consumption, reduced bus loading and increased performance to achieve speed compliance.

Methods for encoding a video information stream are disclosed. A video information stream comprises of a time ordered time sequence of video frames. Each of the video frames can be considered as a still image. The video frames are represented as an array of pixels. The video frames of a video information stream can have different sizes and locations with respect to a fixed reference. Besides light intensity and color for each pixel position additional information can be stored. For instance it can be specified to which object a pixel belong or possible whether the pixel is not belonging to an object. Pixels not belonging to an object are denoted transparent pixels.

Encoding of the video information stream is done for obtaining another digital representation of the video information stream. The digital representation being more efficient for transmission or storage. The encoding is based on the fact that temporal nearby video frames are often quite similar except for some motion. The arrays of pixels of temporal nearby video frames often contain the same luminance and chrominance information except that the coordinate places or pixel positions of the information in the arrays are shifted some locations. Shifting in place as function of time defines a motion. The motion is characterized by a motion vector.

Encoding of the video information stream is done by performing encoding of the video frames of the time sequence with respect to other video frames of the time sequence. The other video frames are denoted reference video frames.

Any video frame may be a reference frame. For the presented encoding methods it is important to denote how both the video frames to be encoded and the reference video frames are located in time with respect to each order. As such a time ordering of the video frames is explicitly stated in the methods. A video frame situated in time before the video frame under consideration is denoted a previous video frame. A video frame situating in time after the video frame under consideration is denoted a next video frame. The video frame under consideration can be denoted current video frame.

The encoding is in principal based on motion estimation of the motion between a video frame and a reference video frame. The motion estimation defines a motion vector. Motion estimation is based on calculating a norm of the difference between parts of two video frames. Such a norm is a measure of the difference between parts of two video frames. Often the sum of absolute differences is used as norm. Other norms can also be used. The norm can also be denoted as a mathematical norm, being an operator on two object, here video frames, measuring the differences between the objects. At least the norm is minimal when the difference is zero, thus when the objects are the same. When the motion is estimated, a motion compensation is performed. The motion compensation comprising of constructing a new motion compensated video frame from the reference video frame by applying the found motion. The motion compensated video frame comprises of the pixels of the reference video frame but located at different coordinate places. The motion compensated video frame can then be subtracted from the video frame under consideration. This results in an error video frame. Due to the temporal relation between the video frames the error video frame will contain less information. This error video frame and the motion estimation vectors are then transmitted, optionally after some additional coding. The substraction and additional coding is further denoted coding. Also padding can be included in the coding.

The encoding will be limited to a part of a video frame. The encoding is also not performed on the video frame as a whole but on blocks of the video frame. The video frame is divided in non-overlapping or overlapping blocks. The blocks are thus arrays of pixels but of smaller size than the video frame array. Blocks can be considered as array of pixels being different to each other by the fact that they are at least partly spacely divided. Note that different video frame can be characterized as arrays of pixels being spaced in time. The encoding operations are then performed on all the blocks of the video frame. As the encoding of a video frame is performed with respect to a reference video frame, implicitly a relation is defined between the blocks of the video frames under consideration and the blocks of the reference video frame. Indeed the calculation of the sum of absolute differences or any other norm will only be performed for a block of a video frame and blocks of the reference video frame which are nearby located. These locations are defined by the maximum length of the motion estimation vector. These locations define a search-area. Blocks of video frames to be encoded are called related when they refer to the same block in the reference video frame. One can also define these blocks as related because they will exploit the same search area in the reference video frame. In the reference video frame also a so-called related block is defined. The related block is the block in the reference video frame used for calculation of a particular norm for a block of the video frame under consideration.

In the application encoding of a video frame with respect to one reference video frame, encoding of a video frame with respect to two reference video frames, encoding of a time sequence of video frames with respect to two reference video frames and methods for motion estimation are presented. The encoding and motion estimation methods are designed such that when implemented on a digital system, the power consumption of the digital system while executing the methods, is minimal. The encoding and motion estimation methods also exhibit excellent performance with respect to other performance criteria such as speed.

The presented methods comprises of operations on data. The operations can be reading from and writing to a memory. The operations can also be arithmetic operations.

The different aspects of the invention are stated below. These aspects can be used independently or combined.

A first aspect of the invention is a method for encoding of at least a part of a video frame with respect to a reference video frame by dividing the video frame under consideration into blocks and performing the basic encoding operations such as motion estimation, motion compensation and block coding (including padding), in the order described above on a block of the considered video frame before considering another block of the considered video frame.

A second aspect of the invention is a method for encoding of at least a part of a video frame with respect to two reference video frames. A time ordering between the video frames to be encoded and the reference video frames is introduced. The encoding method also uses a block based implementation as described above. The application of the basic encoding operations such as motion estimation, compensation and block coding are performed in a particular order.

A third aspect of the invention is the introduction of several methods for encoding of a time sequence of video frames with respect to two reference video frames. As such a merging of the encoding of the video frames is realized. A time ordering between the video frames to be encoded and the reference video frames is introduced. The encoding methods also use a block based implementation as described above. The application of the basic encoding operations such as motion estimation, compensation and block coding are performed in a particular order. The choice between the proposed methods can be done at run-time.

A fourth aspect of the invention is the introduction of a particular implementation of the above defined methods for encoding of a time sequence of video frames with respect to two reference video frames. In the implementation it is specified that the further encoding of blocks is started as soon as this is technically possible. The implementation is denoted a chasing mode implementation.

A fifth aspect of the invention is the introduction of the concept of a group video frame or video frame group for encoding of a time sequence of video frames. The group video frame contains the video frames of the time sequence for which the encoding is merged. The group video frame is divided in cells. The encoding of blocks of the original video frames is merged when the blocks belong to the same cell of the group video frame.

A sixth aspect of the invention is a method for encoding a time sequence of video frames exploiting the group video frame concept thereby performing the motion estimation such that a pixel is reused for all motion estimations in which it is needed. In this method a check is performed to determine whether a pixel is needed for any of the motion estimations. When it is needed, it is read and used for all motion estimations in which it is needed.

A seventh aspect of the invention is a method for determining a motion estimation vector for a block with respect to a reference video frame based on norm calculations, wherein calculation of this norm is excluded when part of the related block in the reference video frame falls out of the reference video frame.

An eighth aspect of the invention are methods for determining a motion estimation vector for a block with respect to a reference video frame based on norm calculations wherein calculation of the norm is excluded when part of the related block in the reference video frame contains transparent pixels.

A ninth aspect of the invention is a method for determining a motion estimation vector for a block with respect to a reference video frame based on an interpolated version of that reference video frame. The interpolated version of the reference video frame is not determined in advance but the interpolated pixels are calculated when needed and not stored.

A tenth aspect of the invention are methods for determining a motion estimation vector for a block with respect to a reference video frame wherein a memory hierarchy is exploited.

BRIEF DESCRIPTION OF THE DRAWINGS

FIG. 2 illustrates original (VOP-oriented) MPEG-4 like source code, showing the various operations (full-pel motion estimation, half-pel motion estimation, motion compensation, coding of error blocks) and the order in which the operations are performed.

FIG. 3 illustrates invented (MB-oriented) MPEG-4 like source code, showing the various operations and the order in which the operations are performed. Various operations are now located in the same loop, resulting in a block-oriented approach.

FIG. 4 illustrates original MPEG-4 like source code for B-VOP encoding in interpolated mode, showing the various operations and the operation order.

FIG. 5 illustrates invented MPEG-4 like code for B-VOP encoding in interpolated mode, showing the various operations and the operation order.

FIG. 8 is a flowchart of block based encoding of a video frame with respect to a reference video frame. Left: Original (VOP-oriented) MPEG-4 like source code. Right: Invented (Block-oriented) source code.

DETAILED DESCRIPTION OF EMBODIMENTS OF THE INVENTION

The invention presents video encoding methods resulting after application of a system level design methodology for data-dominated applications. The methodology exploits innovative code manipulations such as data-flow and loop transformations, and data reuse concepts and is intrinsically based on data transfer and storage issues. The resulting encoding methods can be mapped on different processor architectures such as application-specific or programmable processors and custom hardware. When implemented on a digital system, the methods result in a low power consumption of the digital system, while executing the method. Moreover the methods show excellent speed characteristics.

The aspects of the invention are illustrated for encoding following the MPEG-4 standard. Although the aspects of the invention and the detailed description is given in terms of MPEG-4 terminology the resulting video encoding principles are relevant for any MPEG-4 like type of encoding or any type of encoding exploiting a translational motion model for encoding.

First the MPEG-4 standard is discussed. Source code, representing a straightforward implementation of the standard is presented and further referred to as the original source code. Second some elements of the overall data storage and transfer exploration methodology are presented. Third details about the invented video encoding methods found while applying this methodology to the so-called MPEG-4 original source code are presented.

MPEG-4 Standard

The MPEG-4 standard enables a coded digital representation of video data for efficient transmission or storage [T. Sikora, the MPEG-4 video standard verification model, in IEEE transactions on circuits and systems for video technology, Vol. 7, No. 1, pp. 19–31, February 1997].

The initial video information stream is represented by a time sequence of Video Object Planes, denoted VOPs. Each Video Object Plane represents a frozen image. The Video Object Plane comprises of an array of pixels. The pixels may comprise luminance, chrominance and shape information.

The VOPs are divided in MacroBlocks, denoted MBs. The encoding principle is based on the temporal redundancy existing when considering Video Object Planes, which are located nearby in time. One can consider a second Video Object Plane, situated in the video information stream shortly after a first Video Object Plane, as a by movement distorted version of the first Video Object Plane plus some minor changes. The movement distortion can be seen as the movement of the MacroBlocks of the first Video Object Plane. The motion of a MacroBlock is represented by a motion vector.

The VOPs can be classified as I-VOP or Intra-VOP, P-VOP or Predicted-VOP and B-VOP or Bi-directional predicted VOP.

Figure 1:
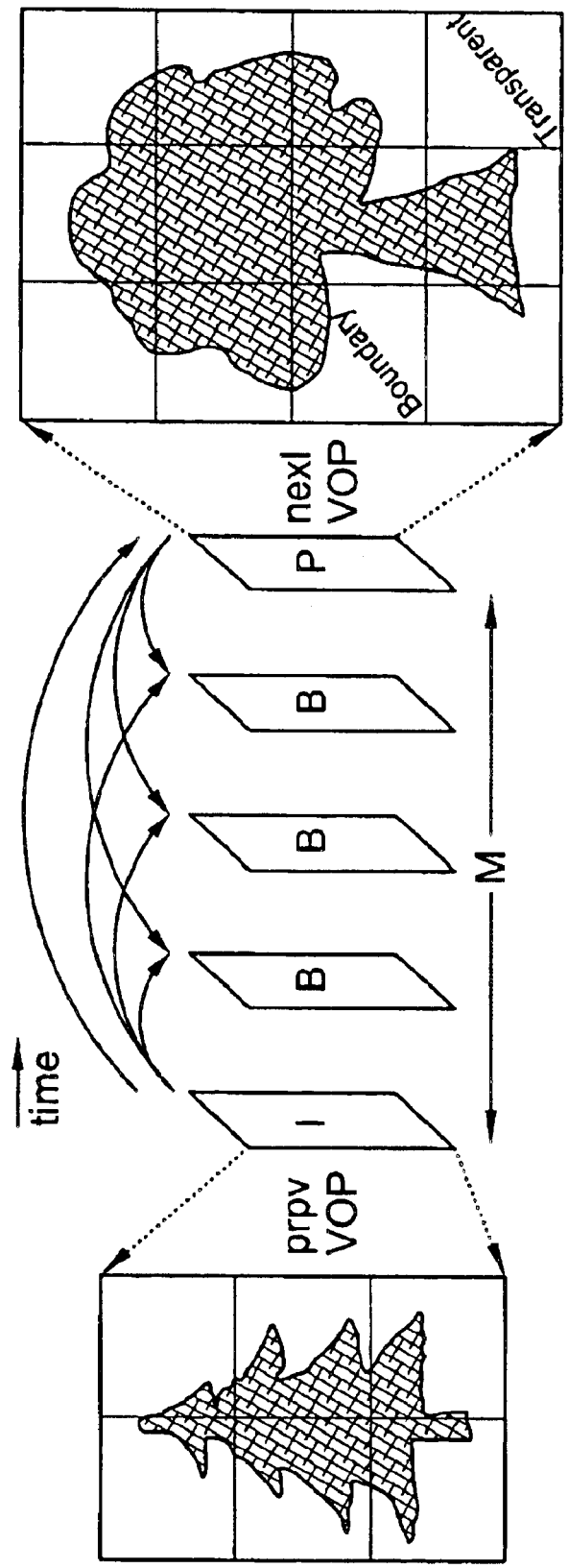
FIG. 1 illustrates a MPEG-4 Video Object Plane time time sequence, comprising of the previous VOP, the next VOP, intermediate or bi-directional VOPs, the VOPs comprising of non-overlapping MacroBlocks, the arrows indicating to which reference VOP the motion of a block of these VOPs will be performed, the blocks can be denoted transparent, boundary or opaque, depending on their location with respect to the object (e.g., the tree) in a VOP.

The basic principle of encoding for P-VOPs goes as follows (FIG. 1, FIG. 2, FIG. 8): given the previous VOP and the next VOP, the motion of the next VOP relative to the previous VOP is estimated, then the next VOP is reconstructed based on the previous VOP by incorporating the motion. This constructed VOP is subtracted by the lookalike real next VOP. The resulting error VOP can be encoded by less bits and is used for transmission and/or storage. I-VOPs are used as initialization of the above procedure and send once a while for re-initialization purposes. The above described procedure is not performed for the whole VOP but for the MacroBlocks of the VOPs.

Full search also called full-pel motion estimation estimates the motion between two VOPs of the time sequence. As the VOPs are divided in MBs the motion estimation is performed sequentially for each MB. Only when essentially for all MB of the VOP motion estimation is performed, motion compensation and coding is performed.

Full-pel motion estimation of a MB is based on the calculation of the sum of absolute differences, denoted SADs, between a MB of the next VOP in the previous VOP at every possible position of the motion vector, denoted MV, with a certain maximum MV length, defining the size of the search-area.

When SAD of the full-pel motion estimation is below a predetermined value the motion estimation is improved by a half-pel motion estimation. When the SAD of the full-pell full search motion estimation is above the predetermined value, the MB is intra-coded. With intra-coding is it meant that the MB is coded and transmitted without exploiting the temporal redundancy.

The half-pel motion estimation works as follows: at the best full-pel position, found before, nine half-pel SADs are calculated. These SADs are based on the MB and spatial interpolated pixels of the previous VOP. These spacial interpolated pixels are defined with interpolation/averaging the adjacent pixels. Storage of the interpolated pixels increases the memory usage.

To support objects the concept of the alpha plane is introduced, which is a bitmap indicating which pixels are inside a shape or not. A pixel which is outside a shape is called a transparent pixel. Moreover, this invokes a classification of the MBs of the VOP as follows: transparent when the MB is located outside the shape, opaque when the MB is located inside the shape and boundary MB when some pixels are inside the shape. Only pixels inside a shape may be used in motion estimation SAD-calculations.

In the original source code motion estimation, motion compensation are separate and are working on entire VOPs, as illustrated in FIG. 2 and FIG. 8 left. For all MB of the VOP first motion estimation is performed, then motion compensation for all MB of that VOP and finally coding of all MB of that VOP.

B-VOP-s are situated between P or I-VOPs and are encoded by using information of the previous and next P or I-VOP, resulting in even more efficient coding. Small difference exist in the original source between P-VOP and B-VOP motion estimation. P-VOP motion estimation is supported by both block (parts of MBs) and MB-motion estimation while B-VOP motion estimation is only MB-block oriented. P-VOP support intra-coding of MB while B-VOP always performs half-pel motion estimation. Several modes for B-VOP motion compensation exist such as: previous VOP, next VOP, interpolated or direct mode. In the interpolated mode the reconstructed VOP is the interpolation of the best match with the previous and next VOP. In the direct mode the motion vector is determined based on next P-VOP motion vector combined with half-pel motion estimation. The interpolated mode is implemented as in FIG. 4.

Notice that while using MPEG-4 encoding it is expected to receive first the previous VOP, then the next VOP and the time sequence of B-VOPs. In practice the VOPs are not recorded/displayed in this order, so reordering hardware is necessary.

MPEG-4 is used for illustration and is in no way limiting the scope of the invention. Therefore while describing the particular aspects of the invention the following more general terminology is used. Encoding of a time sequence of video frames (for instance VOPs) is considered. The video frames are divided in blocks (which are the MacroBlocks in MPEG-4). In the examples the MPEG-4 concepts Macroblock or MB and Video Object Planes or VOPs are used. The video frames, serving as reference for encoding are called reference frames throughout the text. The blocks of MPEG-4 are denoted subblocks.

Data Storage and Transfer Exploration Methodology

Transmission of a video information stream is performed by encoding the video information stream into a different digital representation of the video information stream by an encoding digital system. The different digital representation is efficient for transmission. The digital system has means for sending the digital representation to a second digital system. The second digital system has means for receiving the digital representation and able of decoding the digital representation, resulting in the original video information stream, naturally partly corrupted due to the transmission and/or coding. Note that the same principles can be used for storage.

Encoding of a video information stream by a digital system results in power consumption of the digital system. The amount of power consumed by the digital system depends on the encoding method. An encoding method comprises of a set of instructions or operations, performed on the video information stream. The power consumption of the digital system can be minimized by constructing the encoding methods in a particular way. The construction is started with an initial encoding method, which is not so optimal with respect to power and which is then transformed into a more power optimal version by using innovative code manipulations. Construction of the method is preferably supported by a design methodology.

The underlying principles of the data storage and transfer exploration methodology are such that when the method is implemented in a digital system the redundancy in data transfers can be reduced, locality in the accesses, so that more data can be retained in registers local to the data-path, is introduced, a hierarchical memory organization, where smaller memories can be accessed the most, can be used in the digital system and the 1-port less power consuming memory alternatives instead of N-port memories are favored. The methods can be implemented in an application-specific or a programmable processor.

The major applied code transformation steps in the methodology are: data-flow transformation (removing data-flow bottlenecks and redundant storage and access), global loop transformations (improving locality and regularity in the accesses) and exploration for data reuse.

Two main basic assumptions are taken into account explicitly in the methodology: a hierarchical and intermediate organization is needed in between the processor cores and the typically power-hungry external memories used in the system architecture and as often (in multi-media applications) the critical loop body is small, the use of a simple hardware instruction cache should be sufficient to remove the power bottleneck for instruction fetching. This can further be improved by using a distributed cache organization while avoiding unnecessary overhead.

It must be emphasized that the data storage and transfer-methodology is orthogonal to the other non-application specific technological power consumption reduction principles mentioned earlier.

Methods For Low Power Consuming Video Encoding

Throughout the further text MPEG-4 like terminology like blocks and video frames (related to the MPEG-4 concepts Macroblock (MB) and Video Object Plane (VOP) respectively) are used. Although the aspects of the invention are illustrated for encoding following the MPEG-4 standard, this does not limits the scope of the invention to this standard.

A video information stream comprises of a time sequence of video frames. A video frame can be considered as a frozen image. A video information stream is encoded by encoding the video frames. The video frames are encoded with respect to at least one reference video frame. It is possible to encode only part of a video frame.

The presented method explicitly takes into account that the video frames of a time sequence can have different sizes and/or location with respect to a fixed reference, e.g. the display and that objects are supported.

A first aspect of the invention is a method for encoding of at least a part of a video frame with respect to a reference video frame by dividing the video frame under consideration in blocks and performing the basic encoding operations such as motion estimation, motion compensation and block coding in the order described above on a block of the considered video frame before considering another block of the video frame. Although not limited to the video frame under consideration will be part of the same sequence of video frames to which the reference video frame belongs.

Figure 7:
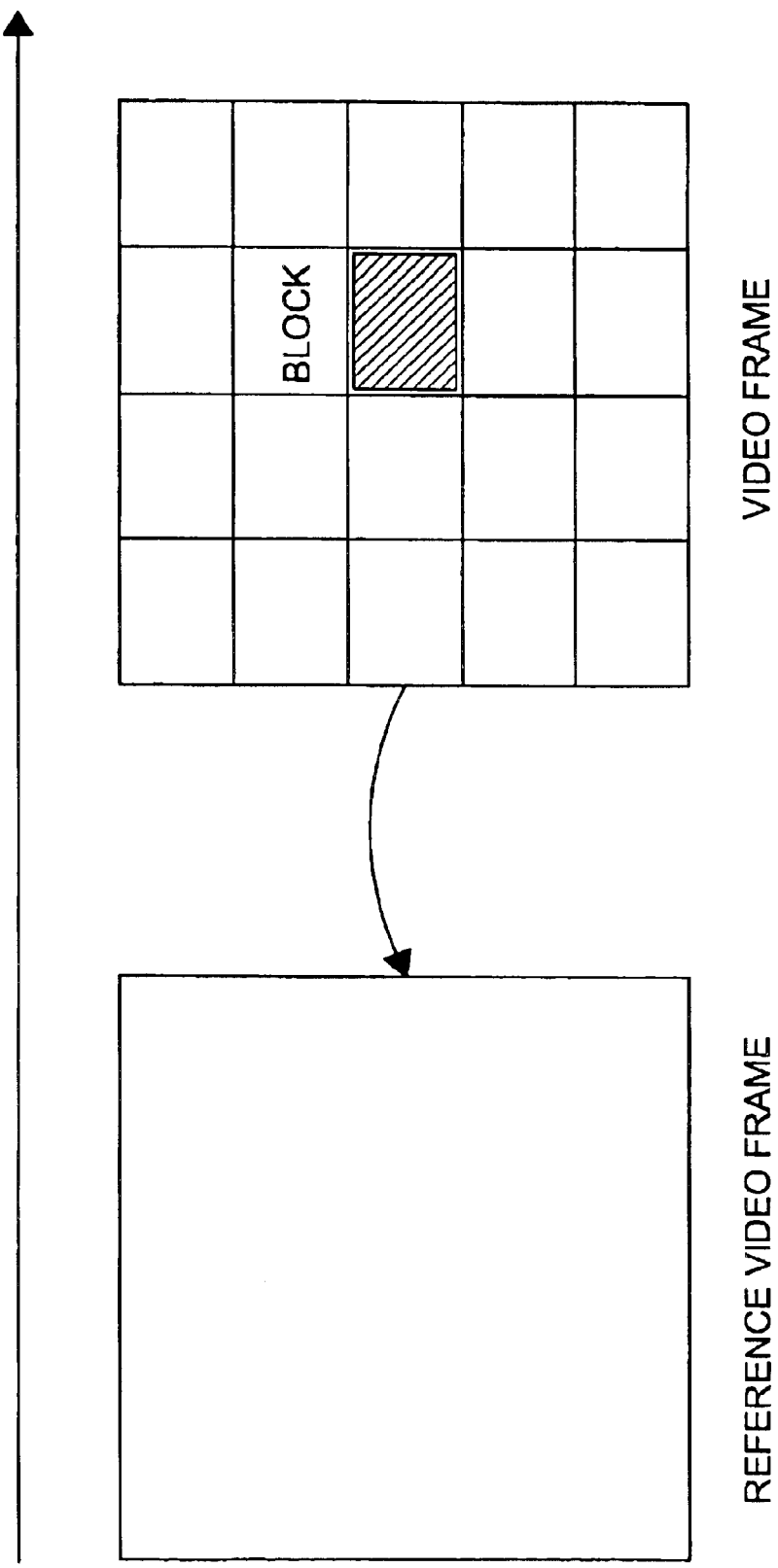
FIG. 7 is an illustration of the principle of block division. A video frame can be represented as an array of pixels. A block can then be represented as a subarray of the pixels, with smaller sizes. Motion estimation of a block of a video frame is performed with respect to a reference video frame.

FIG. 7 illustrates the principle of block division. A video frame can be represented as an array of pixels. A block can then be represented as a subarray of the pixels, with smaller sizes. FIG. 8 right shows a flowchart of the proposed method.

In the original MPEG-4 source code mentioned earlier the motion estimation of MBs of an entire VOP is done in 1 loop before performing MB compensation and MB coding. In the invention the original source code for encoding a time sequence of VOPs (FIG. 2 and FIG. 8 left) is transformed such that the code works on MB level instead of on VOPs (FIG. 3 and FIG. 8 right). By merging the MB loops, all the basic operation motion estimation, compensation and coding, will have the same MB loop. The transformation imposed above makes the source code MB oriented instead of VOP oriented In general it can be stated that the original source code for encoding of a video frame in a MPEG-like sense, is transformed from a version using entire video frames as basic elements to be processed into a version using blocks as basic elements, resulting in realizations with a more optimized power consumption. Using smaller basic elements to be processed for encoding a video frame, instead of encoding the video frame at once, is done in order to obtain a more power consumption optimal architecture as smaller basic elements results in smaller memories to be accessed frequently. Block-oriented encoding is also exploited in the methods described further.

In the invention MPEG-4 like encoding of a video frame is described which is realized in a block-oriented way. Note that with coding of a block it is meant encoding of the error-block, found by substracting the original block and the block found by motion compensation. Also padding can be included in coding.

Figure 9:
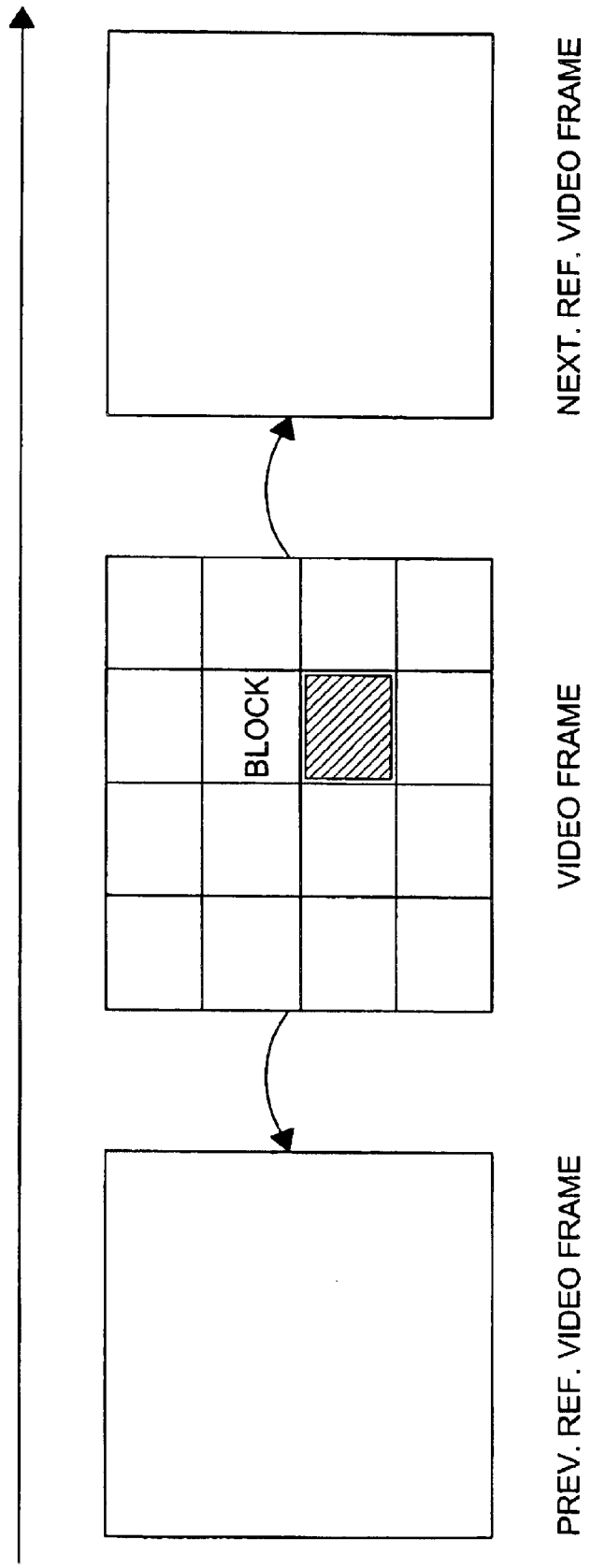
FIG. 9 illustrates motion estimations of blocks of a video frame are performed with respect to two reference video frames, one located before the video frame, one located after the video frame.
Figure 10:
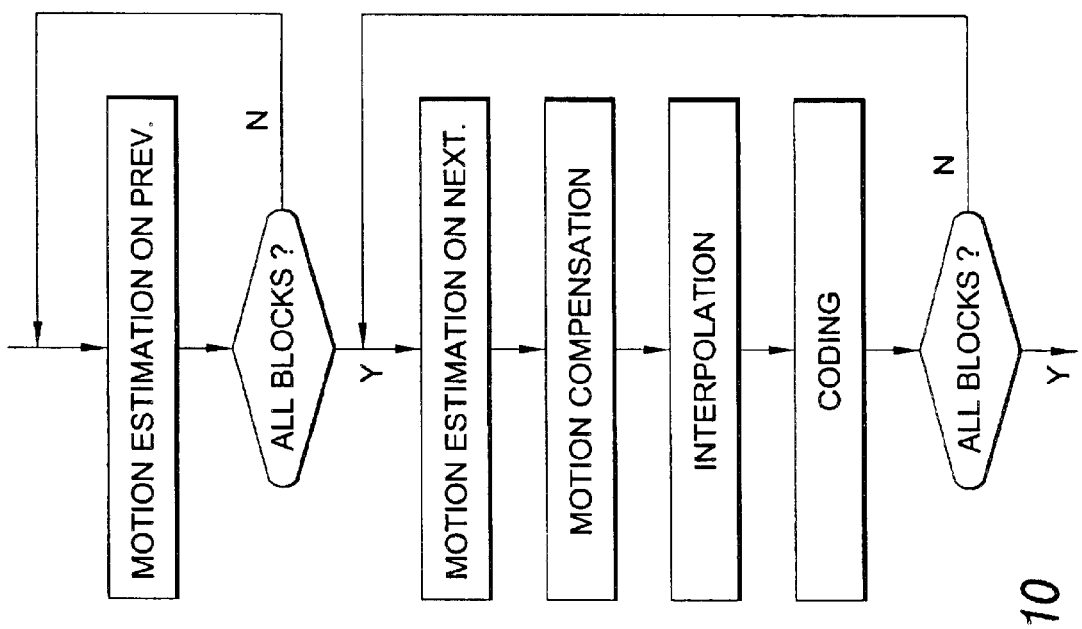
FIG. 10 is a flowchart of block based encoding of a video frame with respect to two reference video frames as described by FIG. 5.

A second aspect of the invention is a method for encoding of at least a part of a video frame with respect to two reference video frames (FIG. 9). A time ordering between the video frame to be encoded and the reference video frames is introduced. This defines a previous and next video frame. The encoding method also uses a block based implementation as described above. The application of the basic encoding operations such as motion estimation, compensation and block coding are performed in a particular order as depicted in FIG. 10.

In the interpolated mode of B-VOP encoding of the original MPEG-4 source code (FIG. 4), the best MB match of the previous VOP is interpolated with the best MB match of the next VOP. The motion estimation functions on the previous and next VOP are located in two separate loops. The interpolation needs the pixels of both matches and at least one of the two will be non-local due to the loop separation. In the invention the ordering of the loop is changed such that the source code of FIG. 5 (and FIG. 10) is obtained. The full-pel motion estimation to the previous VOP is fixed in the first loop, but the motion compensation and even the halfpel motion estimation function can be shifted to the second loop.

When this is done the storage in between the loops will change from storage motion compensated previous VOP to storage of the half-pel motion vectors or even to storage of the full-pel motion vectors respectively. Storage of the motion compensated VOP is clearly bad for power consumption, it will need a huge storage and many accesses to store and retrieve the motion compensated data. The very small storage gain, for storing the full-pel vector in instead of the half-pel vector, is negligible in comparison with the extra non-local previous VOP access when the half-pel motion estimation is shifted to the second loop.

In the invention an MPEG-4 like encoding of a video frame is described which is realized in a block-oriented way and with reference to two reference video frames. A time ordering between the processed video frames and the defined reference video frames is assumed. The interpolation function encodes the error-block, found by substracting the original block and the block found by interpolating the blocks found by both motion compensations. The particular ordering of the encoding operations results in an improved data locality, resulting in a more power consumption optimal architecture.

This aspect can be formulated as follows:

A method of encoding of at least a part of a video frame with respect to two reference video frames of which one previous reference video frame is situated in the video frame time sequence before the video frame and one next reference video frame is situated in the video frame time sequence after the video frame, the part of the video frame being divided into blocks, comprising the steps of:

performing motion estimation of a block with respect to the previous reference video frame for all the blocks of the part of the video frame;

thereafter performing motion estimation of a block with respect to the next reference video frame;

thereafter performing motion compensations of the block;

thereafter interpolating the best match of the block with respect to the previous and next reference video frame;

thereafter coding of the block;

the last four steps are performed in the order for all the blocks of the part of the video frame on a block-by-block basis.

Figure 11:
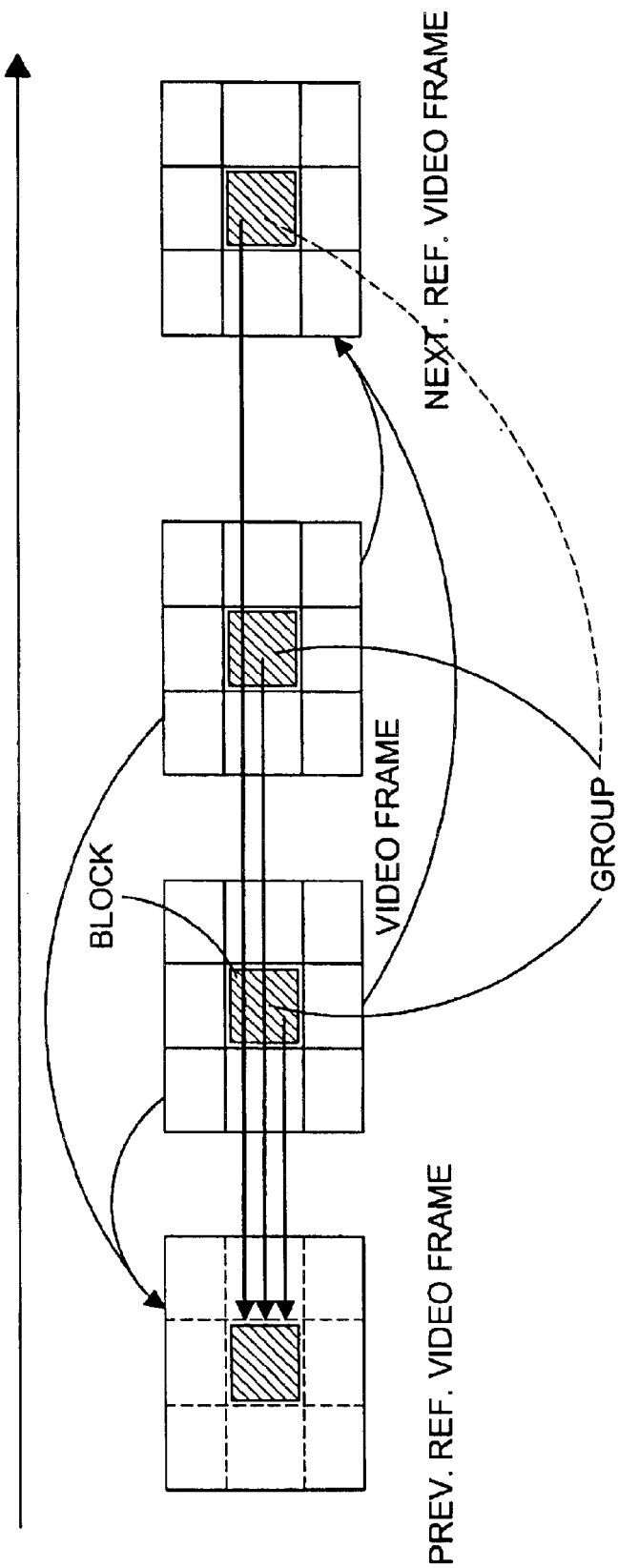
FIG. 11 illustrates motion estimations of blocks of a time sequence of video frame are performed with respect to two reference video frames, one located before the video frame, one located after the video frame. The blocks of the video frames in between the reference frames and the blocks of the next reference video frame can be grouped in a set or group when they relate to the same block of the previous reference frame.

A third aspect of the invention is the introduction of methods for encoding of a time sequence of video frames with respect to two reference video frames (FIG. 11). A time ordering between the video frames to be encoded and the reference video frames are introduced. The encoding methods can also use a block based implementation as described above. The application of the basic encoding operations such as motion estimation, compensation and block coding are performed in a particular order. The video frames in between the two reference video frames are called intermediate video frames.

A MB of the VOP for which the encoding must be performed, referred to as the current VOP and the current MB, are compared with a part of a reference VOP, often the previous P-VOP. Only in B-VOP encoding the next P-VOP is also used. The reference VOP must not be scanned fully as the motion vector is assumed to have only a limited length. This defines a search-area for the MB in the reference VOP.

In principle first the encoding of the next P-VOP is performed and subsequently for each of the B-VOPs separately. Another approach is to combine the encoding of the different VOPs. New encoding methods based on combination are proposed. It must be emphasized that the encoding of the B-VOPs with respect to the next VOP is based on the reconstructed next VOP for error propagation reasons.

Figure 12:
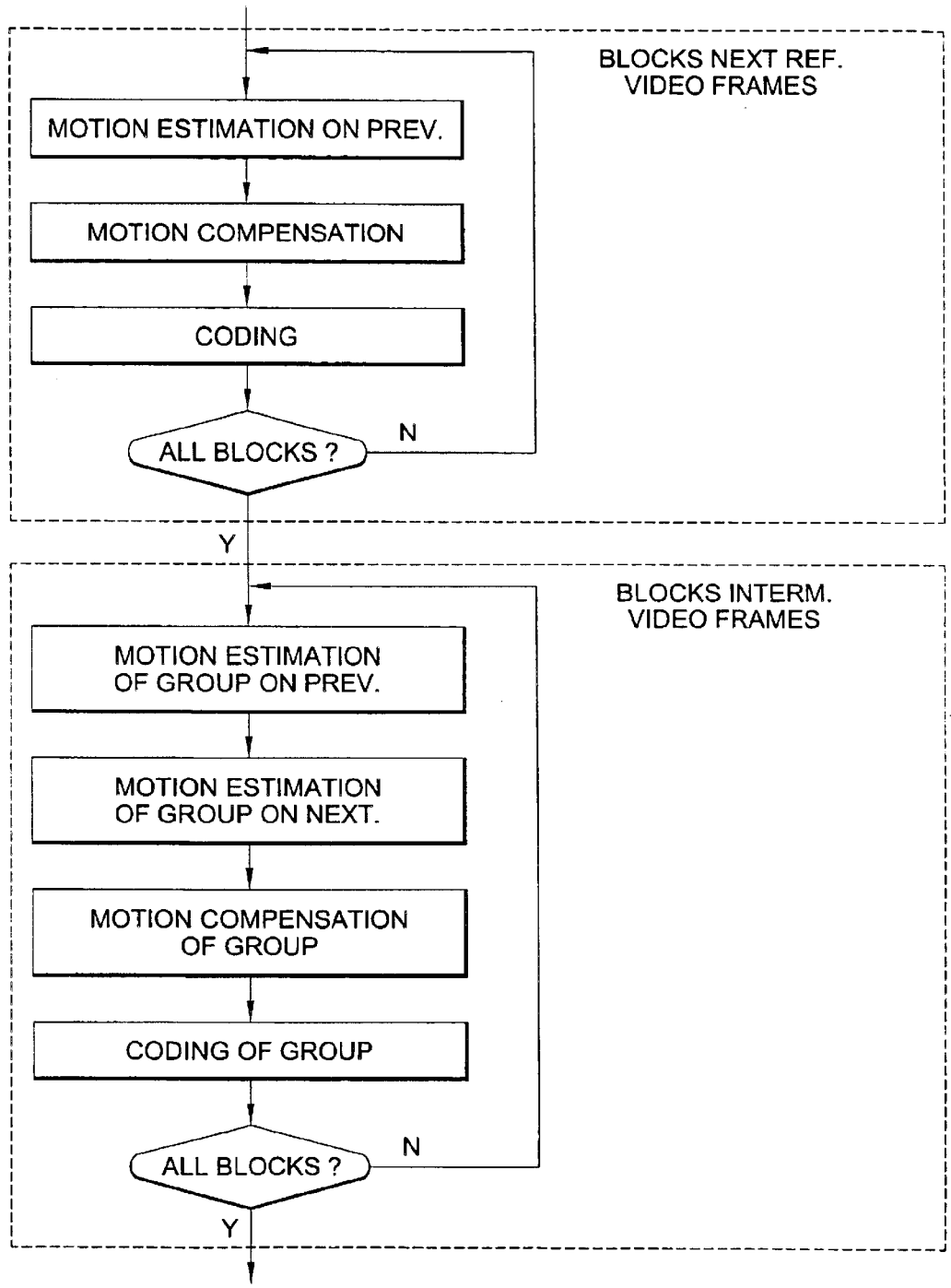
FIG. 12 is a flowchart of block based encoding of a time sequence of video frames in which a merging of the operations on the blocks of the intermediate frames is performed.

In a first method the motion estimation of all MB of the next reference VOP with respect to the previous VOP is performed first, followed by MB compensation including reconstructing and coding. Only when the full next reconstructed VOP is available, is the B-VOP intermediate video frames motion estimation, compensation and coding with respect to two reference VOPs performed, but in such a way that MBs, referring to the same MB in the reference VOPs, are grouped in one set. The encoding of the MBs is done set by set (FIG. 12).

The motion estimation of the next reference VOP with respect to the previous VOP can be done block based as in the first aspect of the invention or in the conventional way (for all blocks motion estimation, then for all block motion compensation, then for all blocks coding). Also for the intermediate VOPs both the block based or the conventional frame approach can be exploited.

Figure 13:
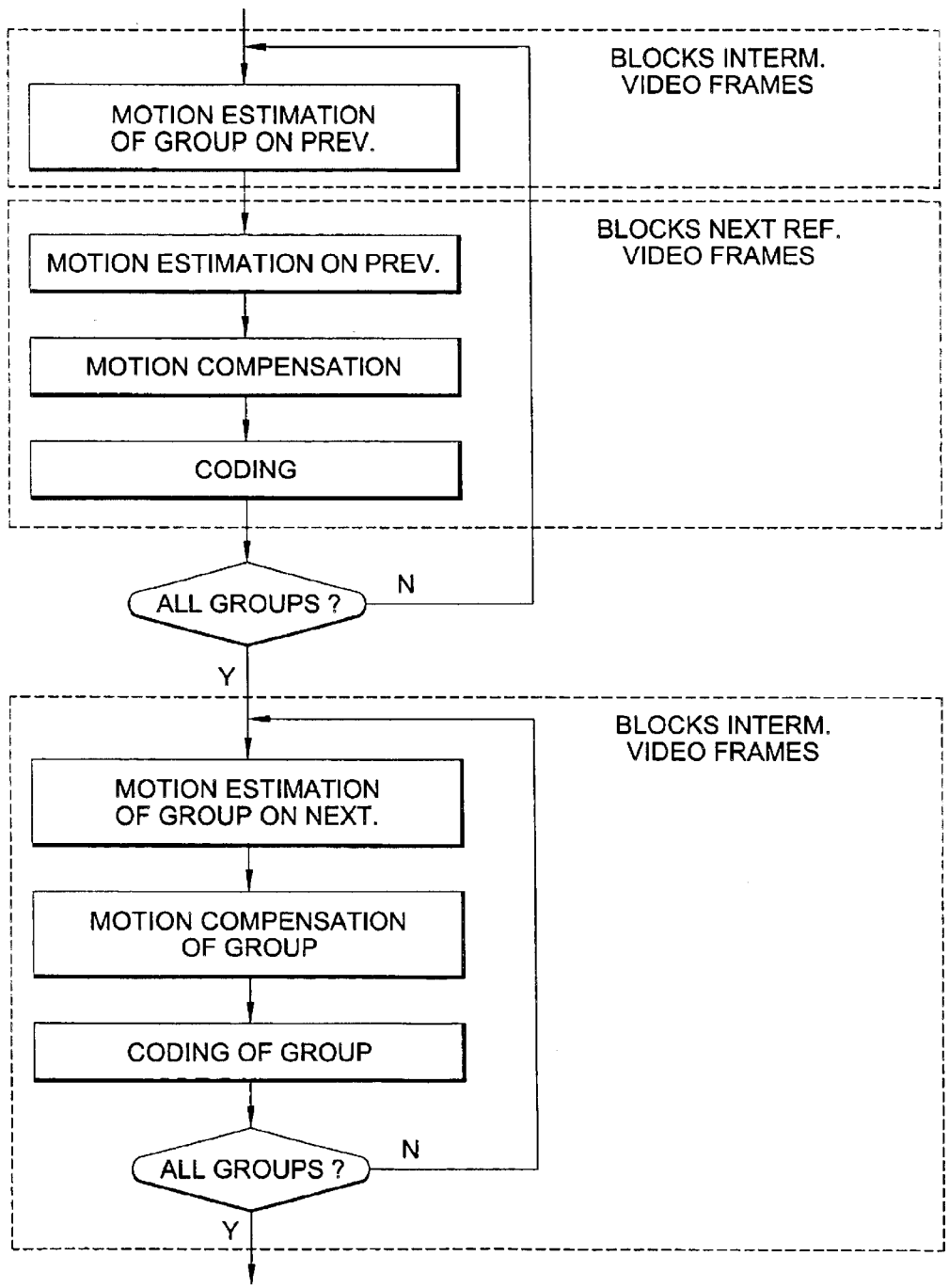
FIG. 13 is a flowchart of block based encoding of a time sequence of video frames in which a merging of the operations on the blocks of both the intermediate and the next reference frame is performed.

In a second method all the motion estimations with respect to the previous reference VOP, P- and B-VOP's, or more in general next reference video frame and intermediate video frames are combined. For the P-VOP also the compensation including reconstructing and coding is performed. Afterwards all the B-VOP operations such as motion estimation, compensation and coding are performed with respect to the next VOP. Again the MB, related to the same MB in the reference VOP, are grouped and set by set encoding is performed (FIG. 13).

Other groupings can be used. One alternative is to group motion estimations for B-VOPs (intermediate video frames) located before and after a previous reference video frame together with the next reference video frame. When these motion estimations are performed, the next reference video frame is motion compensated. Another alternative is to group motion estimations of intermediate video frames with respect to both the previous and next reference video frame inclusive also the motion estimation of the following next reference video frame with respect to the next reference video frame.

In the invention an MPEG-4 like type of encoding for a time sequence of video frames with respect to two reference video frames is proposed. A time ordering between the processed video frames and the defined reference video frames is assumed. The method is block-oriented. The blocks of the processed video frames are grouped into sets. The blocks of each set refer to the same block in the reference video frame, meaning that under ideal conditions for the motion estimation of such blocks the same search-area is needed. The selection of the blocks can be based on a simple selection based on their position or a more advanced grouping mechanism. The encoding of the time sequence may be based on a set-by-set processing of all the blocks.

When implementation on a digital system is considered one of the methods is often implemented. An alternative way is to implement one of the methods and to decide during run-time, based on some run-time conditions which method is executed.

In a fourth aspect of the invention so-called chasing methods are introduced. In the above proposed methods the next VOP is entirely built before executing the motion estimation on it. But as it is clear that the MB motion estimation does need only its related search-area in this next VOP, the motion estimation can already start when the first-search area becomes available. This is the so-called chasing mode of these methods.

In the invention methods are presented incorporating chasing. There is specified that the motion estimation of blocks starts as soon as the related block in the reference video frame becomes available.

A fifth aspect of the invention is the introduction of the concept of a group video frame for encoding of a time sequence of video frames. The group video frame contains the video frames for which the encoding is merged as described above. The group video frame is divided in cells. The encoding of blocks of the original video frames is merged when the blocks belong to the same cell of the group video frame. Preferably the cell size is equal to the block size.

Figure 14:
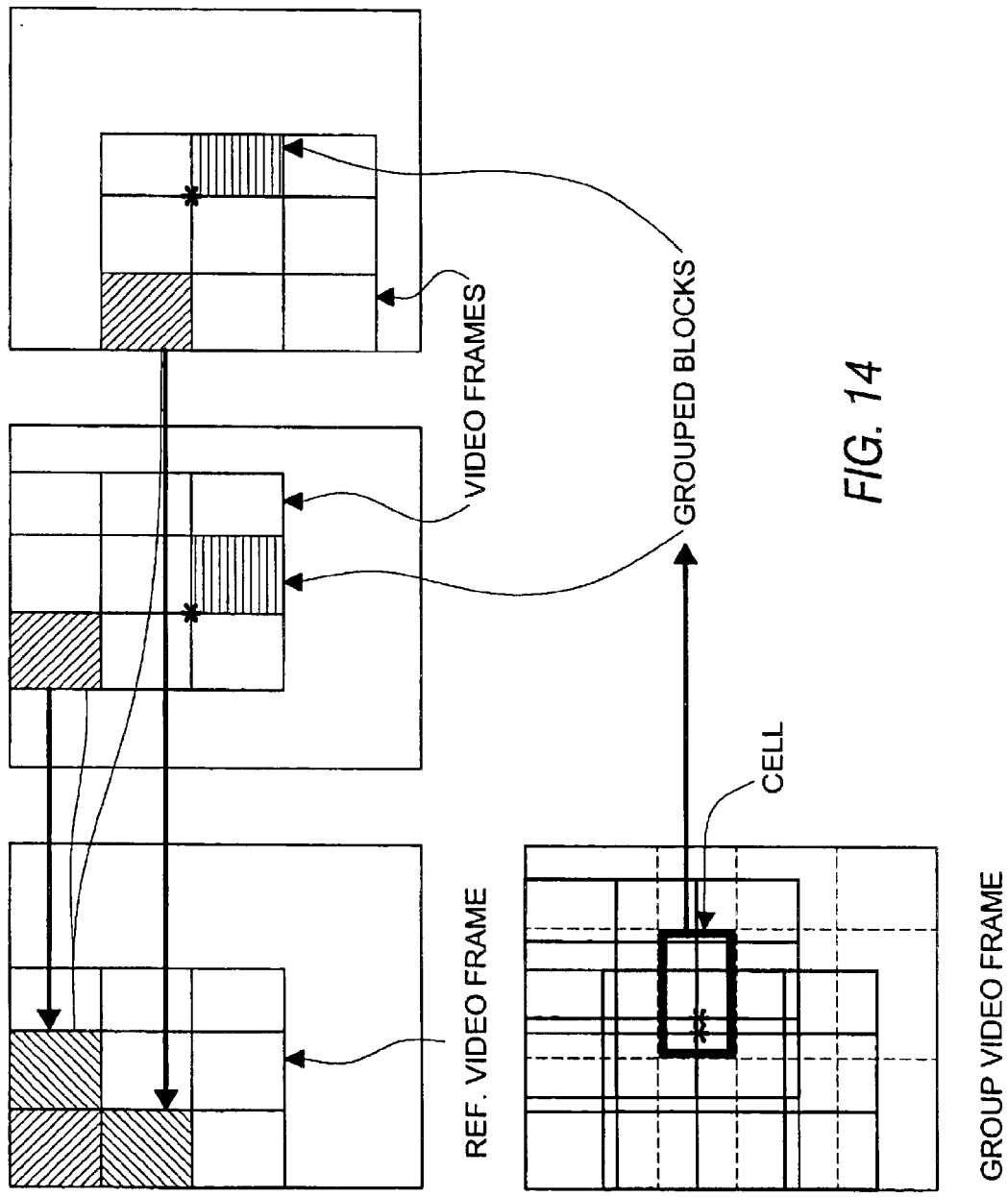
FIG. 14 illustrates a method for grouping blocks for combined encoding. A group video frame is defined. The group video comprises of cells. Blocks of video frames which reference position fall in the same cell are merged.

Merging of the encoding of different VOPs can pose problems when the different VOPs change size and position. The combined MB have a poor overlap, which is recognized as a misalignment or mismatch problem. This is illustrated in FIG. 14. When the blocks to be grouped would be selected just based on their relative position in their corresponding video frame (left hatched blocks) and placed back in the reference video frame, indicated by the dark arrows and the right hatched blocks, this results in no overlap of these blocks and thus a poor overlap of their search area.

By selecting close to each other MBs of the different VOPs, the search-areas overlap of these MBs will be bigger. The group-VOP is an artificial VOP which contains the area of all the VOPs in the group, considered for combined encoding. As a VOP is divided in MBs, a group-VOP is divided in cells (dashed line). Those MBs that fall in the same cell of the group-VOP are grouped and merged in one encoding step. A check whether MBs fall in the same cell is based on checking whether a certain reference position, for instance the upper-left corner is used in FIG. 14, of the MB belongs to the cell. In FIG. 14 the horizontal hatched blocks are selected. The MB loop will now go over the cells and at every iteration it will process a group of MBs from the real VOPs, resulting in a small misalignment or mismatch. The maximum misalignment between the MBs of a group with this approach is equal to the cell size. In spite of the small misalignment between the MBs, the combined search-area is bigger than one single search-area. It increases with the misalignment. The search-area size is determined by three components: the size needed for the motion vector positions, the size of the matched MB and the misalignment.

In the invention a method for the encoding of a time sequence of video frames is proposed by introducing the group video frames with its cells. It is emphasized that each block has a reference position and that blocks having their reference position in the same cell are grouped into one set. The encoding of the video frames is done by encoding all the blocks of one set before proceeding with the next set.

An sixth aspect of the invention is a method for encoding a time sequence of video frames exploiting the group video frame concept whereby the motion estimation is performed such that a pixel is reused for all motion estimations in which it is needed. In this method a check is performed to determine whether a pixel is to be included in the calculations of any of the motion estimations. When it is needed, it is read and used for all motion estimations in which it is needed.

When performing half-pel motion estimation (HPME) of MBs in MPEG-4, belonging to the same set while exploiting the group-VOP concept, it is found that these HPMEs often use the same interpolated pixels, resulting in expensive rereads. Reuse of the interpolated pixels in foreground memory for half-pel motion estimation (HPME) of MBs is introduced. Checks are performed to skip the unneeded pixels and parallel calculation of the SAD is proposed. There is indeed a considerable overlap between the half-pel motion estimation between the MBs of one group.

Their overlap is data dependent on the found full-pel motion vectors. The HPME bounding box is defined as a rectangular box drawn around the needed area for the entire HPME. The source can be transformed to a version which reuses the interpolated pixels in foreground memory. Every pixel is read once and is used for every HPME position and all MBs of the set. This will be the optimum since the interpolated pixel reads are the biggest cost here. The HPME loop traverses through the entire HPME bounding box for which the bounds can be calculated in advance. At every pixel position, a check is done if the pixel is needed for any of the half-pel motion estimation positions and the unneeded pixels are skipped. If the pixel is needed, the pixel will be read and used in all half-pel motion estimation positions and all the MBs which need the interpolated pixel.

Figure 15:
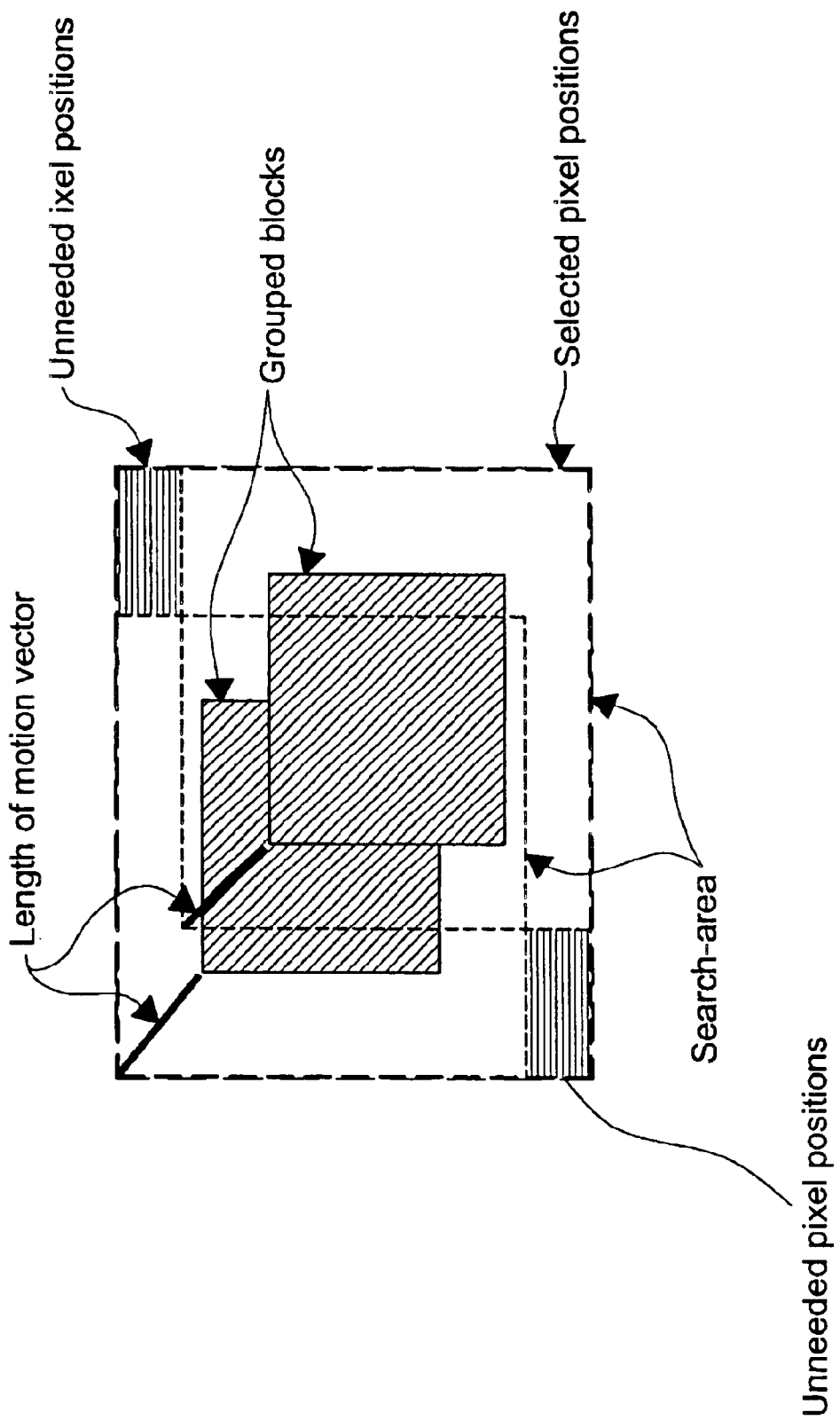
FIG. 15 illustrates two grouped blocks of a video frame are shown with their corresponding search-area. It is shown that the bounding box of these two search-areas contains pixels which are not needed. Therefore it is relevant to included in the source code a pixel selection step.
Figure 16:
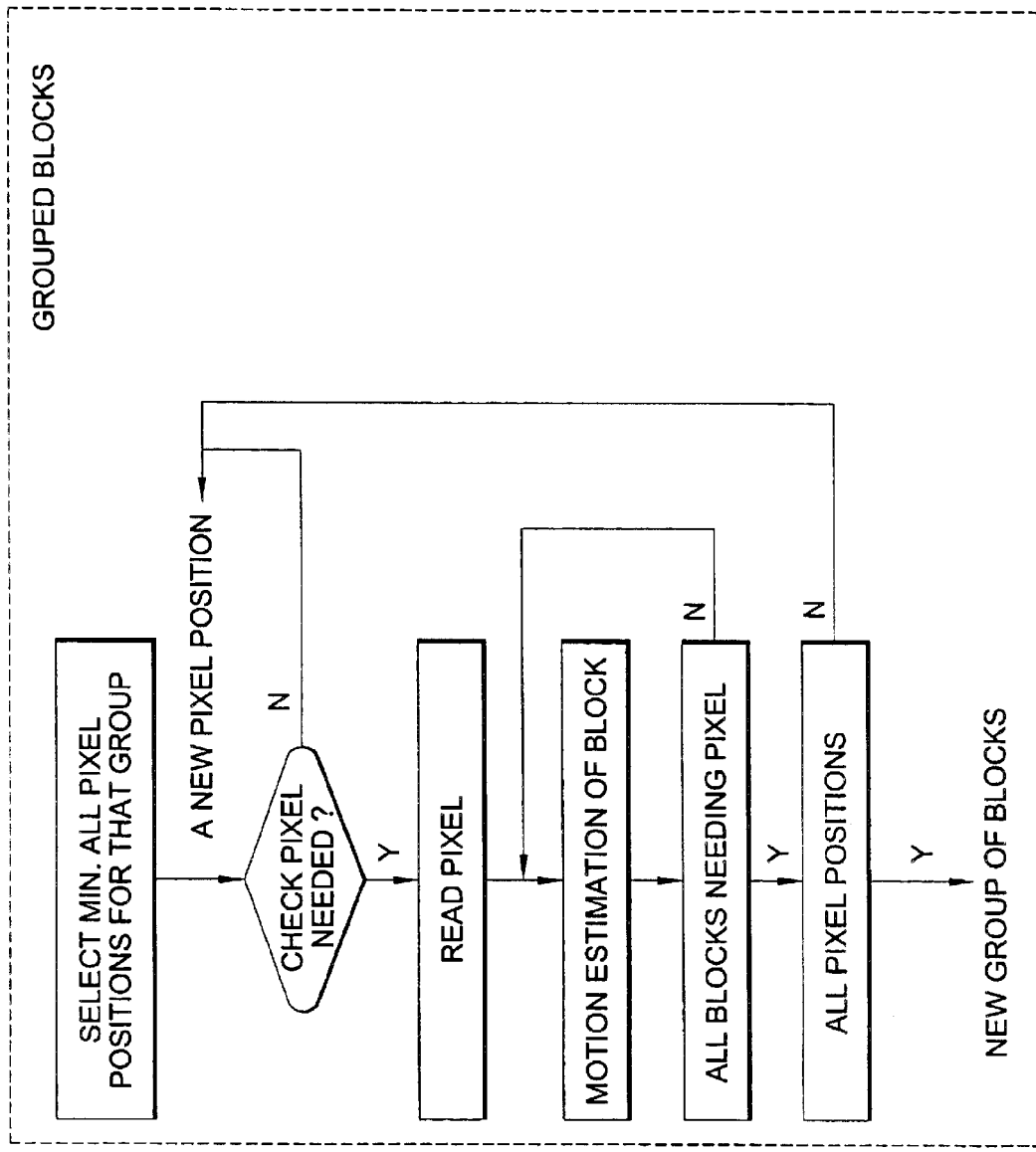
FIG. 16 is a flowchart of motion estimation source code implementing a pixel selection step, based on the principle of FIG. 15. Note that when a pixel is read, it is used for motion estimations of all the blocks which need that pixel.

In the invention (FIG. 15) it is emphasized that in order to reduce pixel reading for encoding of MBs of the same set, first a set of pixel positions indicated by the dark dashed line, minimally containing those pixel positions needed for motion estimation of MBs of the same set is defined, thus at least comprising of the search-areas indicated by dashed lines. These are pixel positions in the reference video frame. Before reading a pixel from this reference video frame, it is checked whether this is needed and when it is needed it is used for all motion estimations that need that pixel (FIG. 16). The positions indicated by the horizontal hatching show the unneeded pixels.

A seventh aspect of the invention is a method for determining a motion estimation vector for a block with respect to a reference video frame based on norm calculations, thereby excluding calculation of this norm when part of the block falls out of the reference video frame.

Note that a motion estimation vector of a block is determined by calculation of a norm between the block, located at some locations in a reference video frame, and the related pixels in the reference video frame the locations are determined by the maximal length of the motion vector. As such a search area is defined.

Figure 17:
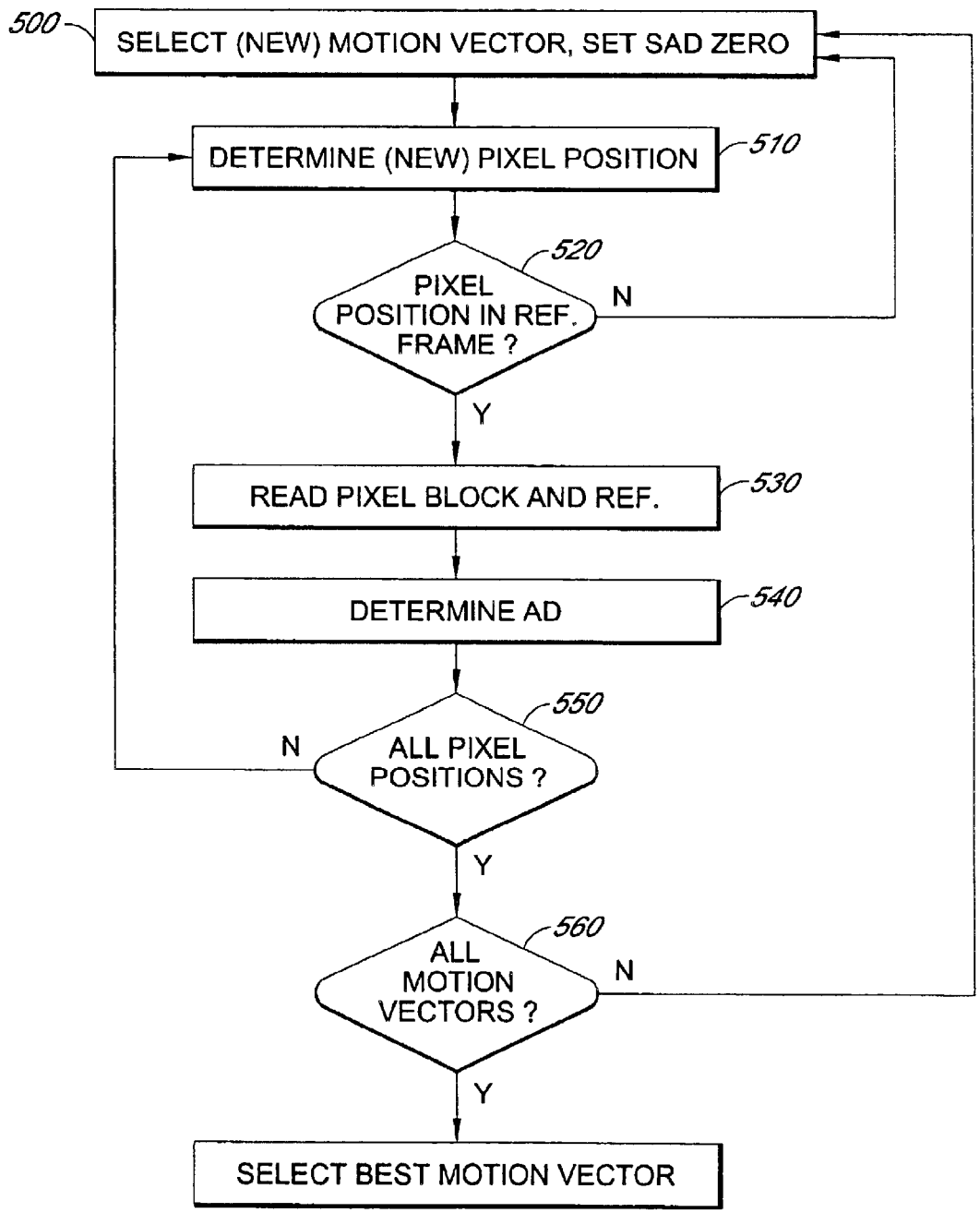
FIG. 17 is a flowchart of motion estimation source code implementing a pixel selection step, excluding pixels lying out of the reference frame. Note that when a pixel is read, it is used for motion estimations of all the blocks which need that pixel.
Figure 19:
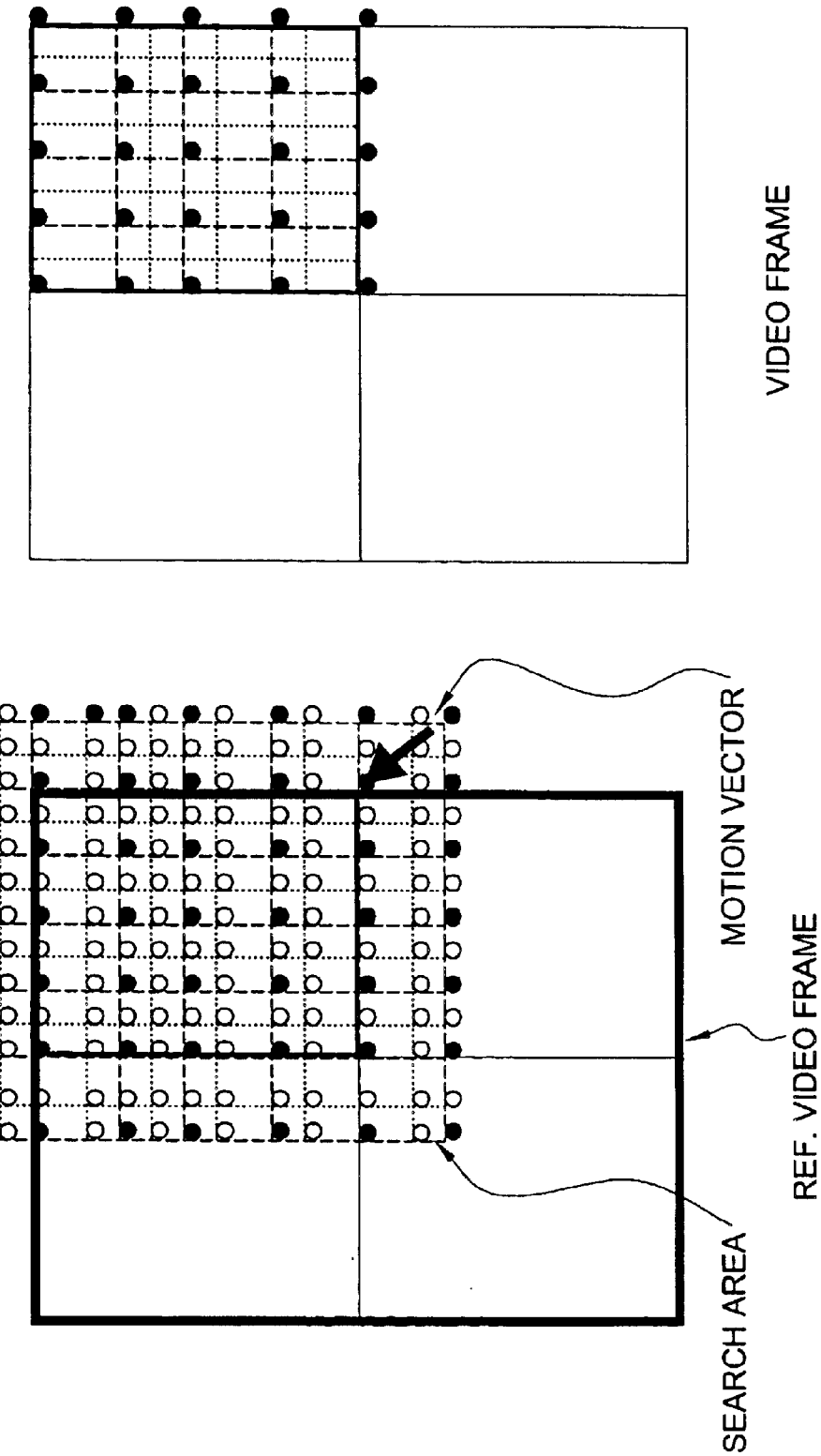
FIG. 19 illustrates a method for encoding based on an interpolated reference video frame. The black bullets are the original pixels of the reference video frame while the white bullets are the pixels determining by interpolating the spacial neighboring pixels.

FIG. 19 shows a video frame with its block and the corresponding search-area in the reference frame which falls partly out of the reference frame. The principle can be exploited both for half-pel and full-pel motion estimation. FIG. 17 show the flowchart of the code of the method.

When one starts with calculation of a norm for a new motion vector, the block under consideration is shifted to the relevant place, determined by the motion vector, in the reference video frame, and the norm (500) is initialized.

Here the sum of absolute differences between pixel values of the block and the reference video frame is used as example. Then a pixel position is selected in (510). When this pixel position lies in the reference video frame (to be checked in 520) the pixel of the reference video frame at that position is read and the pixel of the block under consideration in 530. Then the absolute difference (540) between this interpolated pixel and the pixel of the block under consideration is determined. Then it is checked whether all pixel positions relevant for the norm for that position of the block have been used for calculation of that norm in (550). When this is not the case, a new pixel position is determined in (510). When this is the case, the same process is repeated for another motion vector. When for essentially all motion vectors a norm has been calculated (to be checked in 560), the best motion vector is selected.

In the original source code, when part of the search-area falls outside of the bounding-box of the previous VOP, then the pixel is undefined and by default a high pixel value, causing a bad SAD, is used. In the present invention reads outside the VOP-bounding box are avoided by adapting the search-area.

As an example P-VOP motion estimation, where the next VOP is constructed from the previous VOP, is considered. The search area size on the previous VOP is constrained by the maximum motion vector. Moreover, the position of the search-area projected on the previous VOP is dependent on the next VOP position, previous VOP position and the position of the current MB in the next VOP. The required position of the search-area is known in next VOP coordinates and is converted to previous VOP coordinates. Size and position changes between every two VOPs are causing problems for the existence of the entire search area. If a search-area pixel falls outside the previous VOP bounding box, then the pixel is undefined and a default high value is copied to the array. These high pixel values cause a bad SAD value at the position that uses at least one undefined pixel, outside bounding box. It is however relatively easy to adapt the search-area to the VOP size to prevent reads outside the VOP bounding box. First calculate the wanted bounds of the search-area. Next determine the granted search area which is adapted to the VOP bounding box.

Figure 18:
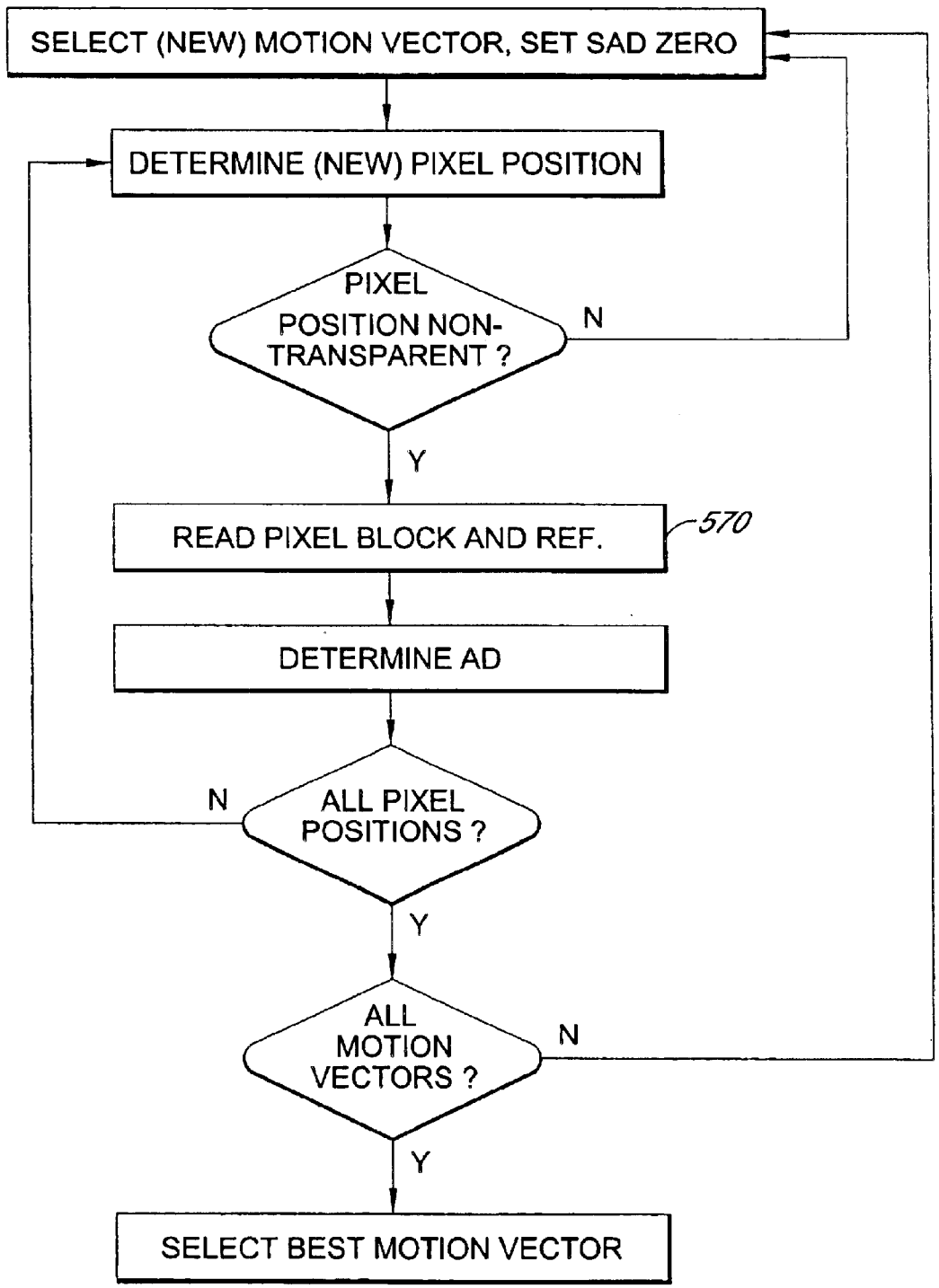
FIG. 18 is a flowchart of motion estimation source code implementing a pixel selection step, excluding transparent pixels. Note that when a pixel is read, it is used for motion estimations of all the blocks which need that pixel.

An eighth aspect of the invention is a method for determining a motion estimation vector for a block with respect to a reference video frame based on norm calculations, thereby excluding calculation of this norm when part of the related block in the reference video frame contains transparent pixels. A code of this method is illustrated in FIG. 18. When compared to FIG. 17 the test 510 of FIG. 17 is replaced by a test 570, checking whether the pixel of the reference video frame is transparent or not.

When in the SAD calculation transparent MB pixels are used, a high pixel value is used (causing a bad SAD). An a priori check on the type of the pixel stored in the so-called alpha plane, avoids the unnecessary access of pixels and SAD calculations. A cheaper implementation of this principle is checking the corners of a bounding box around a shape. Based on the validity, checking whether the corners are lying in a transparent MB of the previous VOP and depending on the case additional checks on the alpha plane, it can be decided whether the SAD calculation must be performed or not.

Figure 20:
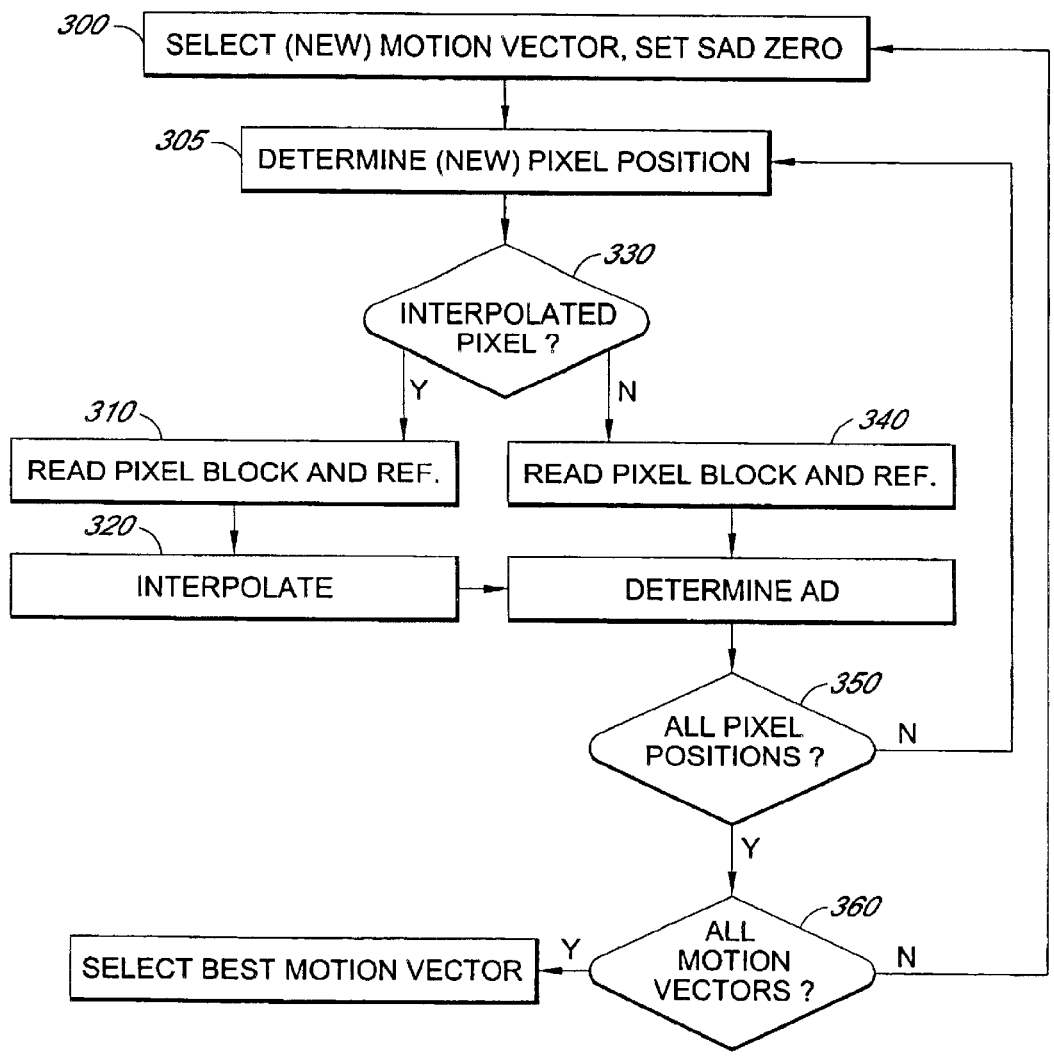
FIG. 20 is a flowchart of motion estimation source code based on an interpolated reference video frame implementing recalculation of the interpolated pixels.

A ninth aspect of the invention is a method for determining a motion estimation vector for a block with respect to a reference video frame based on an interpolated version of that reference video frame. The interpolated versions of the reference video frame are not determined in advance but the interpolated pixels are calculated when needed and not stored. FIG. 19 shows the concept of interpolated blocks. FIG. 20 shows the flowchart of the code of the method. When one starts with calculation of a norm for a new motion vector, the block under consideration is shifted to the relevant place, determined by this motion vector, in the reference video frame, and the norm (300) is initialized. Here the sum of absolute difference between pixel values of the block and the reference video frame is used as example. Then a pixel position is selected in (340). When this pixel position in the reference video frame points to an interpolated pixel (to be checked in (330)), this interpolated pixel is calculated by reading (310) the original pixels of the reference video frame needed for determining the interpolated pixel by interpolation (320). Then the absolute difference between this interpolated pixel and the pixel of the block under consideration is determined (340). Then it is checked whether all pixel positions relevant for the norm for that position of the block have been used for calculation of that norm in (350). When this is not the case, a new pixel position is determined in (340). When this is the case, the same process is repeated for another motion vector. When for essentially all motion vectors a norm has been calculated (to be checked in 360), the best motion vector is selected.

The half-pel motion estimation in MPEG-4 uses the interpolated VOP to find a better match after the full-pel motion estimation. Because of this in the original code the entire VOP is interpolated and stored in the main memory. The total needed storage for an interpolated VOP is four times the storage of the original VOP. Since the interpolation is a simple operation, the interpolated VOP accesses and storage can be removed by recalculation i.e. recalculate an interpolated pixel when needed.

Figure 6:
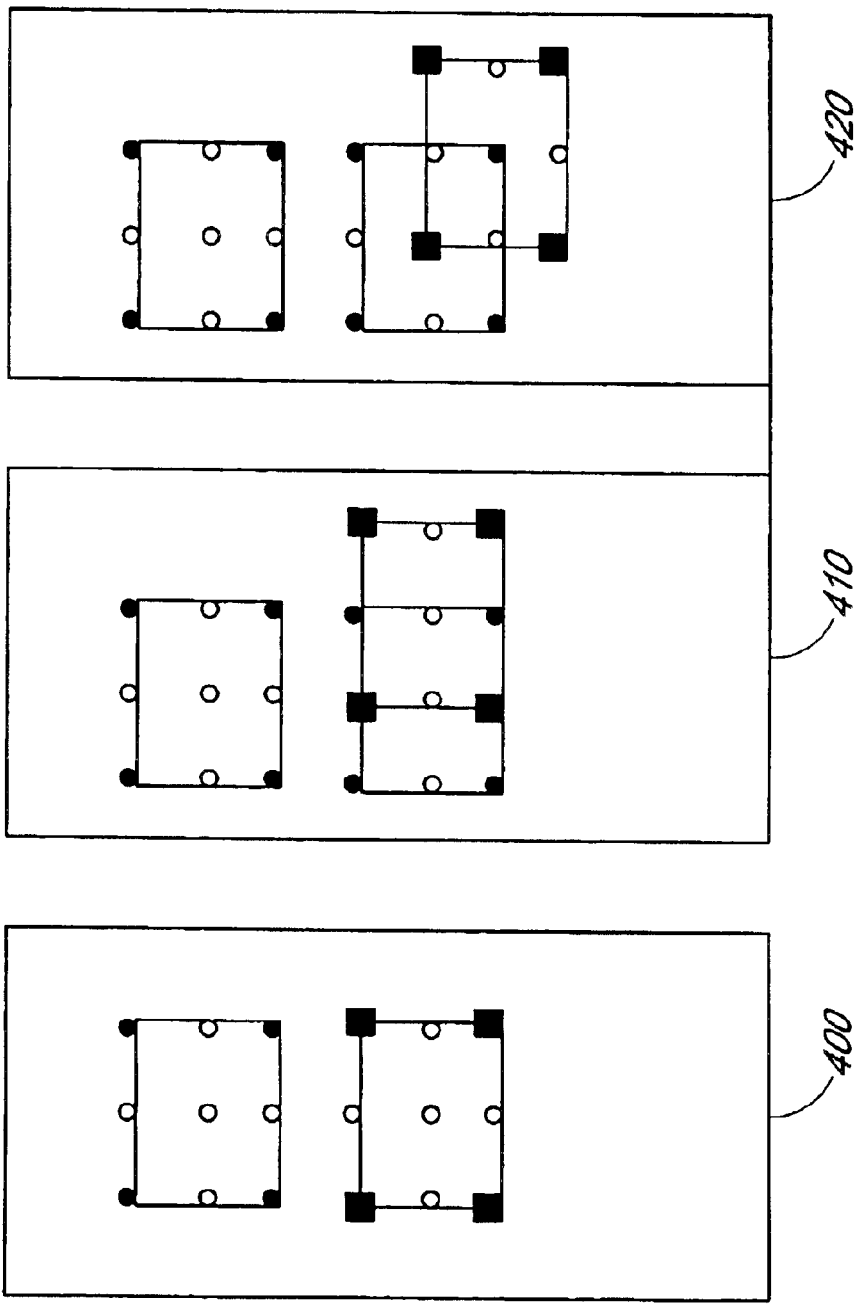
FIG. 6 is an illustration of three situations, depicting when interpolated pixels (open circles) of the reference video frame, comprising of both interpolated pixels and original pixels (closed circles) are exploited, more in particular when the pixels of the video frame under consideration (closed squares) overlap these interpolated pixels.

In the invention a method for motion estimation, comprises determining the motion vector of a block (300) with respect to a reference video frame (310) based on calculation of a norm between the block considered (300) and a block in the reference video frame at positions determined by the motion vector. The motion vector with the corresponding minimal norm is selected. The motion estimation works with an interpolated version of the reference video frame. This means that the norms are now determined for a reference block with more pixels than the original reference block. These extra pixels (indicated by open circles in FIG. 19) are determined by interpolation of the original pixels (indicated by full circles in FIG. 19). An aspect of the invention is that the interpolated pixels are not stored but calculated when needed. These interpolated pixels are needed when the position of the block of the video frame under consideration on the interpolated reference video frame for calculation of a particular norm is such that the block pixels coincides at least partly with interpolated pixels of the interpolated reference video frame. FIG. 6 illustrates this. The blocks on top of these figures illustrate the interpolated reference video frame with original (full circles) and interpolated pixels (open circles). The video frame under consideration is illustrated with its pixels as full squares. Situation (400) lower figure shows a position of the video frame on the reference video frame where the pixels of the video frame do not coincide with interpolated pixels. Situation (410) and (420) shows positions for which such overlap of pixels of the video frame and interpolated pixels appears.

Figure 21:
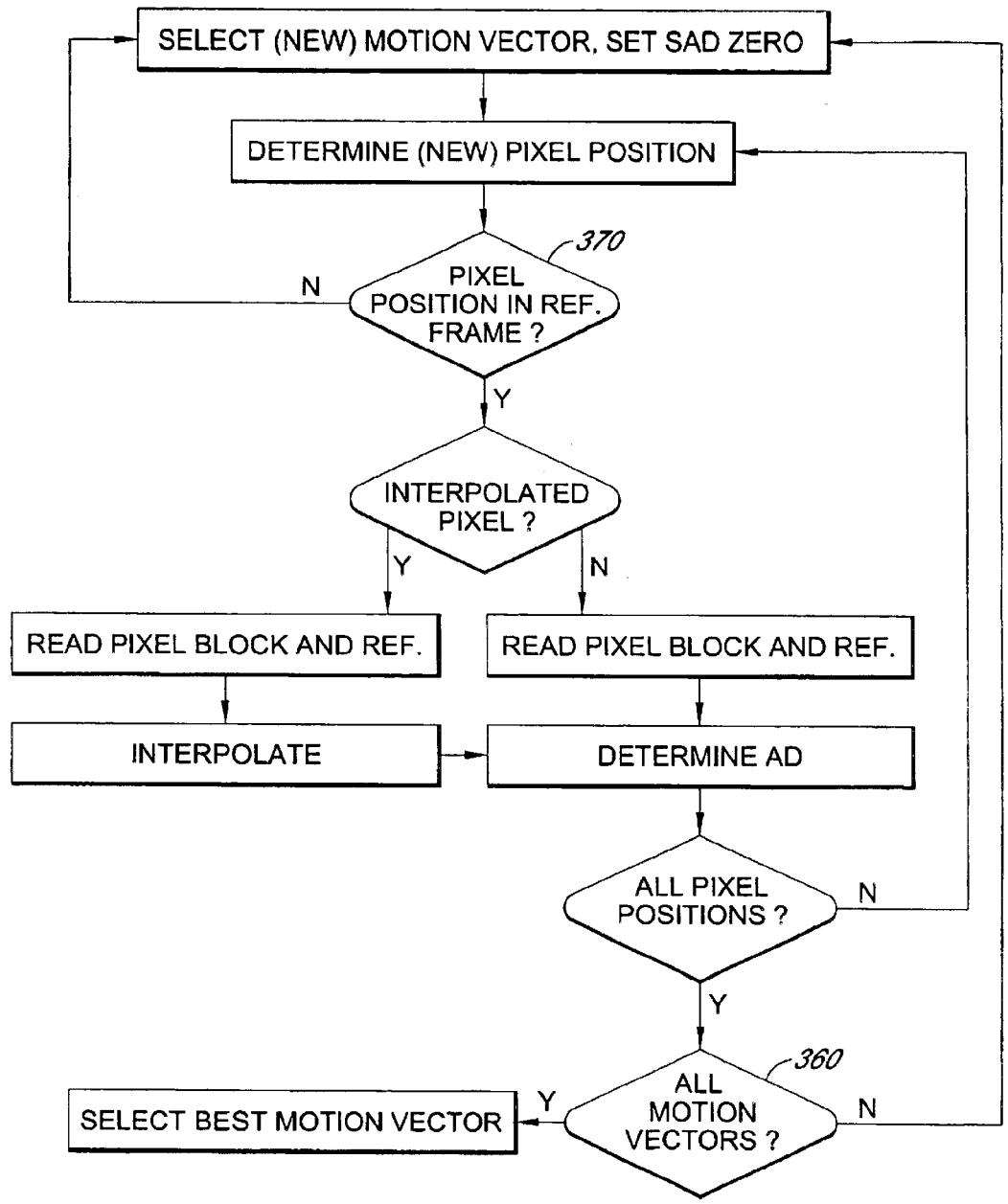
FIG. 21 is a flowchart of FIG. 20, implementing a pixel selection step excluding pixels lying out of the reference frame.
Figure 22:
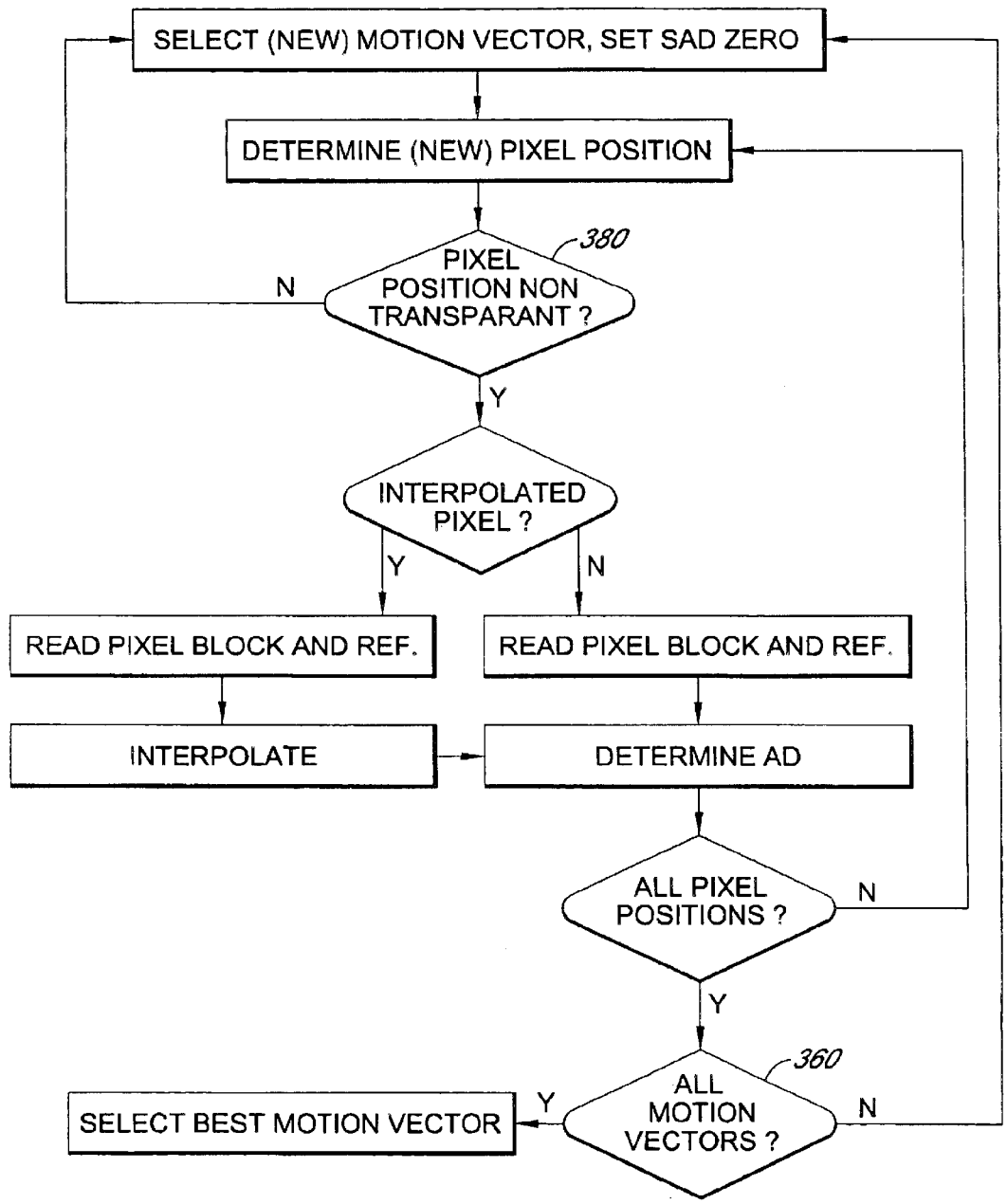
FIG. 22 is a flowchart of FIG. 20, implementing a pixel selection step excluding pixels which are transparent.
Figure 23:
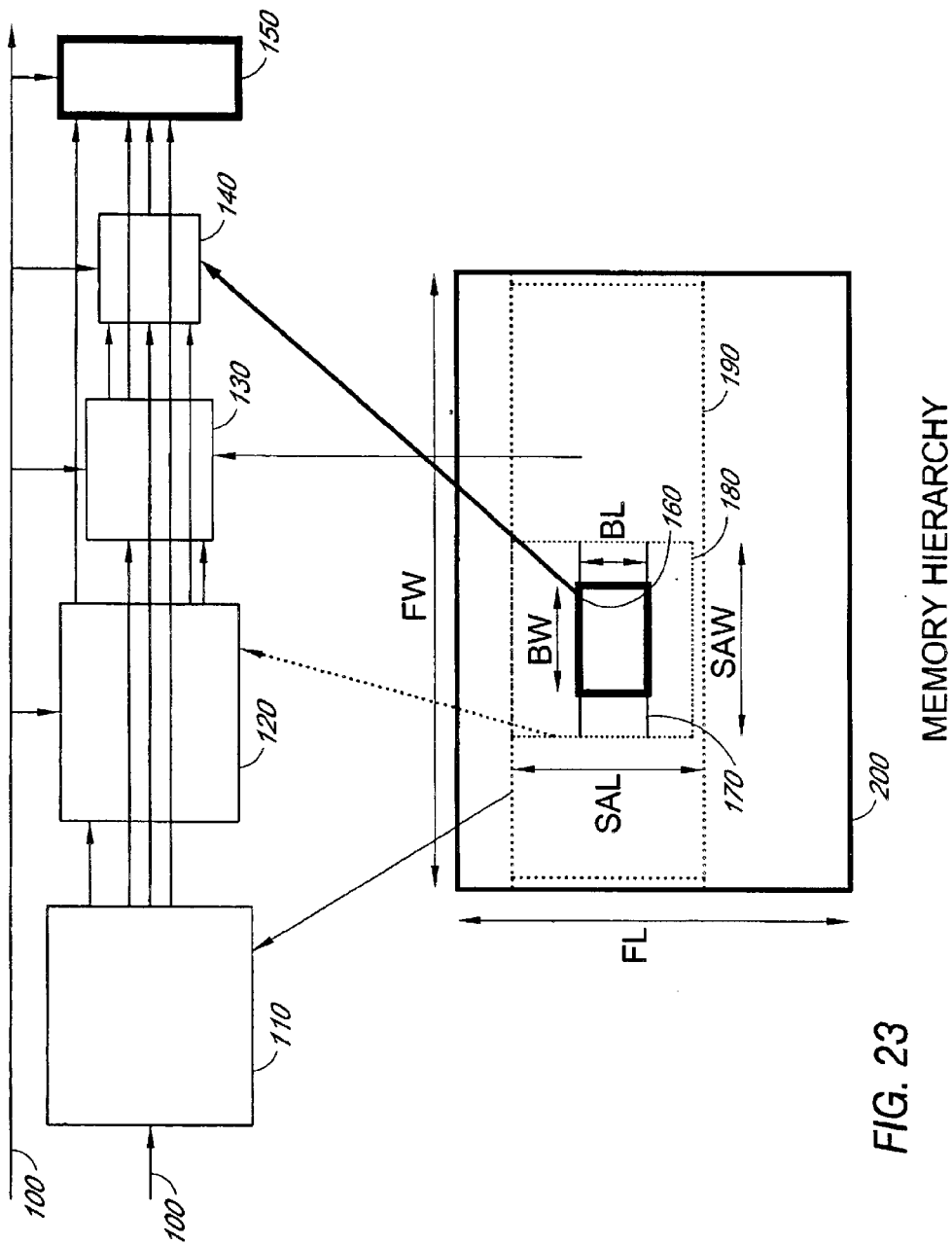
FIG. 23 illustrates a principle of exploiting a memory hierarchy. A set of memories (110, 120, 130, 140) are exploited. The determination of norms goes on in the processor (150). The memories are fed from the main memory via (100). The first memory relates to the search-area band, the second memory relates to the search-area, the third memory relates to the block-band and the fourth memory relates to the block itself.
Figure 24:
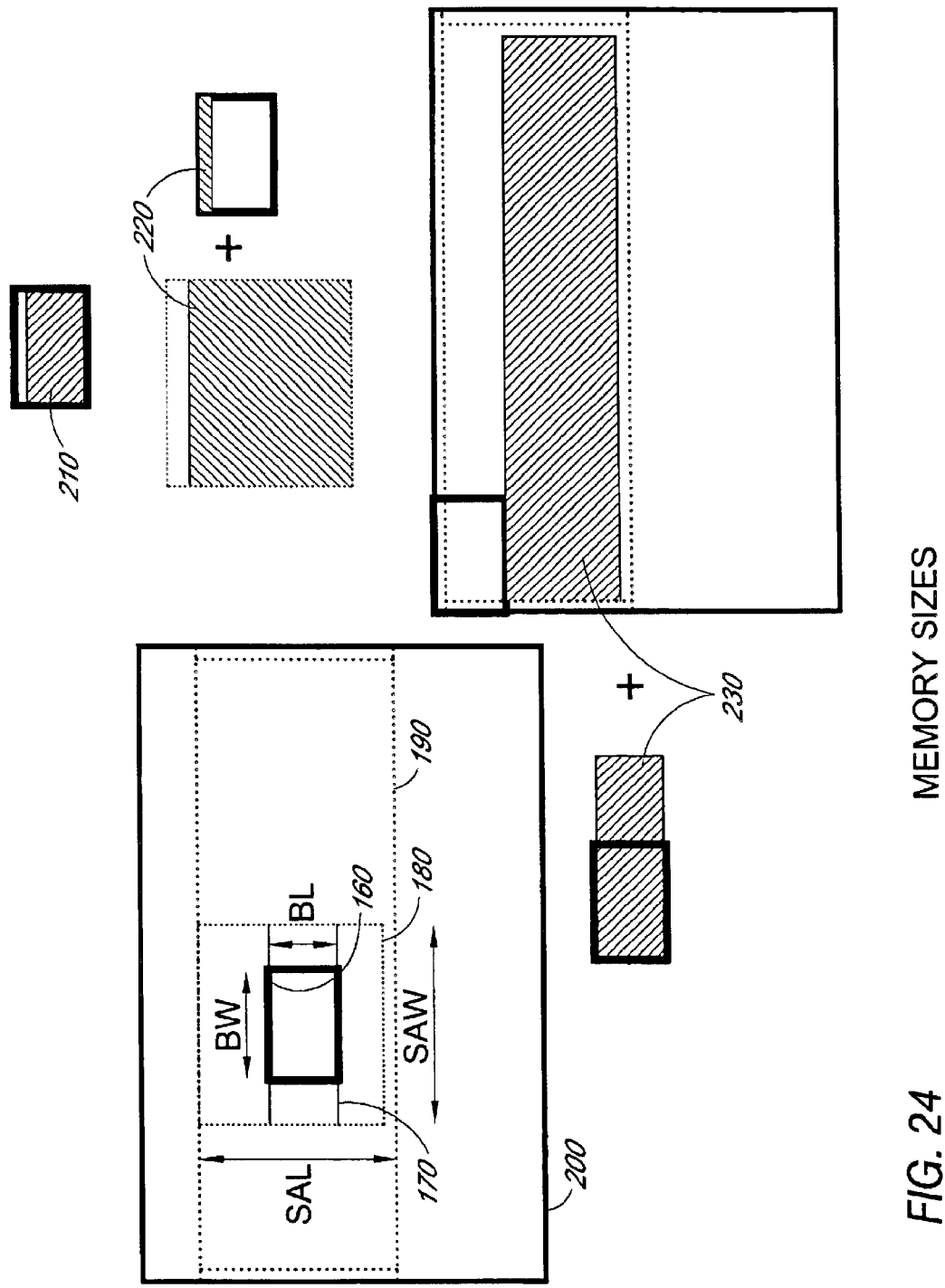
FIG. 24 illustrates lower bounds on the memories of the memory hierarchy. The size of the block memory is lower bounded by a memory size which can contains the pixels of an block indicated by (210). The size of the block band memory is lower bounded by a memory size which can contains the pixels of an block indicated by (220). The size of the search-area band memory is lower bounded by a memory size which can contains the pixels of an block indicated by (230).

The method for determining a motion estimation vector for a block with respect to a reference video frame based on that block and an interpolated version of that reference video frame can be combined with the excluding principles stated earlier thus excluding both pixels lying out of the reference video frame and transparent pixels. In FIG. 21 and FIG. 22 the flowcharts illustrate both excluding principles separately. In FIG. 22 one can observe when comparing with FIG. 20 an additional test (370) checking whether the pixel positions fall within the reference video frame. In FIG. 23 one can observe when comparing with FIG. 20 an additional test (380) checking whether the pixel of the reference video frame on that position is transparent or not.

A tenth aspect is the exploitation of a memory hierarchy in the digital system executing the motion estimation methods. In a straightforward implementation of these methods an architecture comprising a large main memory and a processor should be used. In the main memory the pixels of the video frames are stored. In the invention the use of a memory hierarchy is introduced. Motion estimation wherein at least part of the pixels are accessed from memories (110), (120), (130), (140) which can not contain all the pixels of reference video frame, is presented. Four sizes of memories are introduced. A first memory (140) can preferably contain the pixels of a block (160) in a video frame (200). A second memory (130) can preferably contain the pixels of a block band over the search area (170) in the video frame. A third memory (120) can preferably contain the pixels of the search area (180) in the video frame. A fourth memory (110) can preferably contain the pixels of a search area band (190) over the reference video frame. For each of the memory sizes upper- and lower bounds are determined (FIG. 23) as functions of the block dimensions (Block Width BW, Block Length BL), search area dimensions (Search Area Length SAL, Search Area Width SAW) and video frame dimensions (video Frame Length FL, video Frame Width FW). The dimensions are the memories are optimized in order to reduce the global amount of pixel transfers from the main memory needed for the motion estimation operation. The memories are fed from the main memory via (100). The other arrows indicate pixel transfer between the four memories and between the four memories and the processor (150). The search area can be denoted as a region within the reference video frame determined by the predetermined maximal length of the motion vector sought. The lower bound on the first memory takes into account that one can use a memory which can only contain a pixels of a block with dimensions BL*BW minus one row (210). The lower bound on the second memory takes into account that one can use a memory which can only contain pixels of a block with dimensions (BL-1)*SAW plus the pixels of a block of dimensions of one row thus BW*1 (220). The lower bound on the fourth memory takes into account that one can use a memory which can contain only pixels of a block of dimensions (SAL-BL)*FW plus the pixels of a block of dimensions BL*SAW (230).

Note that throughout the description of the invention with motion estimation of a first block of a video frame with respect to a reference video frame is meant determining for which motion vector, which depicts the place shifting of the first block with respect to its video frame in the reference video frame, a second block in the reference video frame can be found, such that the first and second block are as similar as possible. The result of the motion estimation operation is thus the determination or estimation of the motion vector. Throughout the description of the invention with motion compensation is meant, starting from the with motion estimation found motion vector, shifting the second block with this motion vector. Throughout the description of the invention with coding is meant subtracting the first block and the motion compensated second block, thus obtaining the so-called error-block, further encoding the error-block, possible also including padding.

What is claimed:

1. A method of determining a motion vector of a block of at least of part of a video frame with respect to a reference video frame, the reference video frame comprising a plurality of pixels, the method comprising:
    defining an interpolated version of the reference video frame, comprised of the pixels and interpolated pixels, the interpolated pixels being generated by interpolation of at least two pixels, the interpolated pixels being located adjacent to at least one of the pixels being exploited for the interpolation;
    defining a region within the interpolated reference video frame, the dimension of the region being determined by a predetermined maximal length of the motion vector;
    calculating mathematical norms of the block at a plurality of positions defined by the region in the interpolated version of the reference video frame, wherein the interpolated pixels are calculated when a norm calculation in such a position requires the interpolated pixels; and
    selecting the motion vector having the lowest norm.

2. The method of claim 1, wherein calculation of mathematical norms for positions for which part of the block is not situated in the reference video frame are excluded from calculation; and wherein the method does not determine mathematical norms when the block of the reference video frame which must be compared with the block contains transparent pixels.

3. The method of claim 2, wherein calculation of the interpolated pixels comprises calculating all the interpolated pixels that can be determined with the pixels if these interpolated pixels are not yet available.

4. An apparatus for determining a motion vector of a block of at least of part of a video frame with respect to a reference video frame, the reference video frame comprised of pixels, the apparatus comprising:
    circuitry being adapted for generating interpolated pixels by interpolation of at least two pixels of the reference video frame, wherein the interpolated pixels being located adjacent to at least one of the pixels being exploited for the interpolation, the interpolated pixels and pixels of the reference video frame define an interpolated version of the reference video frame; and
    circuitry being adapted for calculating mathematical norms of the block at a plurality of positions defined by a region within the interpolated video frame, the dimension of the region being determined by a predetermined maximal length of the motion vector, wherein the interpolated pixels are calculated when a norm calculation in such a position requires the interpolated pixels.

5. A system for determining a motion vector of a block of at least of part of a video frame with respect to a reference video frame, the reference video frame comprising a plurality of pixels, the method comprising:
    means for defining an interpolated version of the reference video frame, comprised of the pixels and interpolated pixels, the interpolated pixels being generated by interpolation of at least two pixels, the interpolated pixels being located adjacent to at least one of the pixels being exploited for the interpolation;
    means for defining a region within the interpolated reference video frame, the dimension of the region being determined by a predetermined maximal length of the motion vector;
    means for calculating mathematical norms of the block at a plurality of positions defined by the region in the interpolated version of the reference video frame, wherein the interpolated pixels are calculated when a norm calculation in such a position requires the interpolated pixels; and means for selecting the motion vector having the lowest norm.

6. The system of claim 5, wherein the means for calculation of mathematical norms for positions for which part of the block is not situated in the reference video frame are excluded; and wherein the method does not determine mathematical norms when the block of the reference video frame which must be compared with the block contains transparent pixels.

7. A program storage device storing instructions that when executed performs the method of determining a motion vector of a block of at least of part of a video frame with respect to a reference video frame, the reference video frame comprising a plurality of pixels, the method comprising:

defining an interpolated version of the reference video frame, comprised of the pixels and interpolated pixels, the interpolated pixels being generated by interpolation of at least two pixels, the interpolated pixels being located adjacent to at least one of the pixels being exploited for the interpolation;

defining a region within the interpolated reference video frame, the dimension of the region being determined by a predetermined maximal length of the motion vector;

calculating mathematical norms of the block at a plurality of positions defined by the region in the interpolated version of the reference video frame, wherein the interpolated pixels are calculated when a norm calculation in such a position requires the interpolated pixels; and selecting the motion vector having the lowest norm.

8. The program storage device of claim 7, wherein calculation of mathematical norms for positions for which part of the block is not situated in the reference video frame are excluded from calculation; and wherein the method does not determine mathematical norms when the block of the reference video frame which must be compared with the block contains transparent pixels.

9. The program storage device of claim 7, wherein calculation of the interpolated pixels comprises calculating all the interpolated pixels that can be determined with the pixels if these interpolated pixels are not yet available.

* * * * *